(12) United States Patent
Sharpe

(10) Patent No.: US 12,554,810 B2
(45) Date of Patent: Feb. 17, 2026

(54) DECOMPOSING ATTENTION VALUES TO DE-EMPHASIZE TEMPORAL IMPACTS OF TRANSFORMER MODEL UPDATING

(71) Applicant: Capital One Services, LLC, McLean, VA (US)

(72) Inventor: Samuel Sharpe, Cambridge, MA (US)

(73) Assignee: Capital One Services, LLC, McLean, VA (US)

( * ) Notice: Subject to any disclaimer, the term of this patent is extended or adjusted under 35 U.S.C. 154(b) by 127 days.

(21) Appl. No.: 18/639,848

(22) Filed: Apr. 18, 2024

(65) Prior Publication Data

US 2025/0328610 A1    Oct. 23, 2025

(51) Int. Cl.
*G06F 21/31*    (2013.01)
*G06N 20/00*    (2019.01)

(52) U.S. Cl.
CPC ............. *G06F 21/31* (2013.01); *G06N 20/00* (2019.01)

(58) Field of Classification Search
CPC ......... G06F 21/31; G06F 7/023; G06N 20/00; H04L 41/16; H04N 21/251; H04N 21/466; H04N 21/45; H04N 21/4662
See application file for complete search history.

(56) References Cited

U.S. PATENT DOCUMENTS

| | | | |
|---|---|---|---|
| 11,681,914 B2 * | 6/2023 | Dang | G06N 3/088 706/21 |
| 12,346,404 B1 * | 7/2025 | Zhang | G06F 17/16 |
| 12,367,015 B2 * | 7/2025 | Roper, Jr. | G06F 30/27 |
| 2020/0236402 A1 * | 7/2020 | Spanias | G06N 3/0499 |
| 2020/0258120 A1 * | 8/2020 | Ardulov | G06N 3/082 |
| 2022/0074914 A1 * | 3/2022 | Koeppel | G06N 3/082 |
| 2025/0111075 A1 * | 4/2025 | Krishna | G06F 21/6227 |
| 2025/0259041 A1 * | 8/2025 | Crabtree | G06N 3/042 |

* cited by examiner

*Primary Examiner* — Michael Won
(74) *Attorney, Agent, or Firm* — Foley & Lardner LLP

(57) ABSTRACT

Methods and systems are described herein for decomposing attention values into event components and time components. The attention values may be generated by a transformer model based on time series data. The decomposed attention values can be used to identify instances where the transformer model classified a request into a first class based on an attention value that is influenced by its respective time component more than a threshold amount. In some embodiments, one or more modifications to those attention values may be applied to the influence of the time component on the attention values. The transformer model may reclassify the request based on the modified attention values.

20 Claims, 10 Drawing Sheets

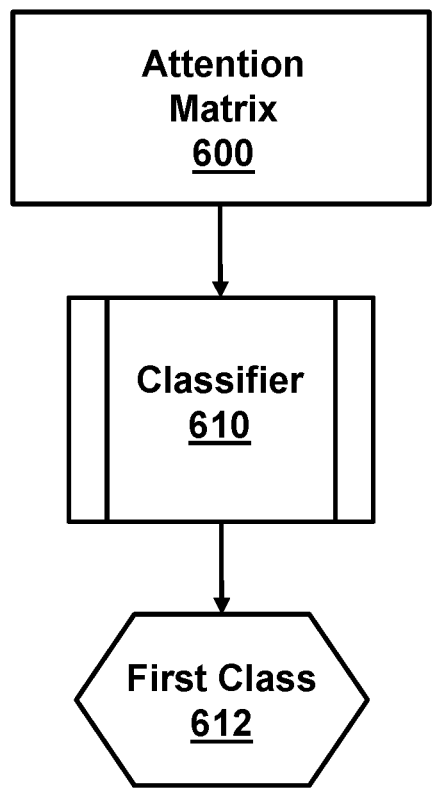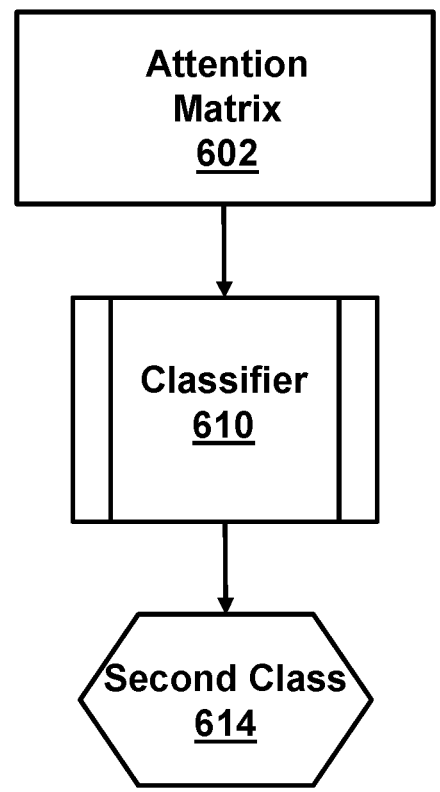
FIG. 6A
FIG. 6B

DECOMPOSING ATTENTION VALUES TO DE-EMPHASIZE TEMPORAL IMPACTS OF TRANSFORMER MODEL UPDATING

BACKGROUND

While transformer models have become increasingly popular in machine learning, they lack the ability to understand relative timing within data and rely on the relative timing when generating predictions. An understanding of relative timing within data is imperative for adapting transformers. This technical limitation may present an inherent problem with attempting to use transformer models, for example, to predict events and understand the components from which the predictions are made.

SUMMARY

Methods and systems are described herein for updating transformer models to understand and account for time when making predictions (e.g., determining whether to authorize a request based on time series data). By decomposing attention scores into event components and temporal components, the transformer model can learn when predictions are too heavily influenced by the temporal components and update its predictions to reduce the temporal components' influence.

Transformer models are designed to process sequences of data, such as text. The transformer models produce attention matrices that indicate how relevant each component of the text is with respect to one another. Thus, the attention matrices can contextualize the text to identify which words were "important" when making predictions.

However, while transformer models are powerful tools to process certain input data types, such as text, they have difficulty dealing with other types of input data, such as time series data. For example, transformers typically operate on fixed-length sequences. Temporal data, however, often comes in variable-length sequences, such as time series data. While techniques like padding or truncation can be used to fit temporal data into fixed-length sequences, this can lead to loss of temporal information or inefficient memory usage. Additionally, while transformers are adept at capturing dependencies within sequences, they do not inherently understand the sequential nature of temporal data. Temporal data relies heavily on the order of events, whereas transformers treat all positions in the sequence equally. This can lead to suboptimal performance when handling time-sensitive tasks. Transformers also have a limited context window due to computational constraints. For tasks involving long-range temporal dependencies, such as predicting events far into the future based on past observations, transformers may struggle to capture the relevant information across distant time steps.

The issues with transformer models are further exacerbated when applied to applications involving authorization requests. For instance, time series data for authorization requests generally includes a series of events that occur at different times. The intervals between these times, however, may not be uniform. This raises issues when trying to understand why a transformer model made certain predictions. For example, the model may struggle to determine whether a certain attention score is large, and thus more important to the downstream classifications, because of the amount of time between when two events occurred or because the events are, themselves, important.

To overcome these technical problems, the disclosed embodiments relate to generating decomposed attention scores produced by transformer models into event components and temporal components. By doing so, the embodiments overcome the technical problems discussed above with regards to transformer models and time-series data generally and allow for the modified transformer model architecture to be used for processing authorization requests. For example, the decomposed attention scores can be analyzed to determine whether the attention score is influenced by its temporal component more than a threshold amount and, if so, can adjust the temporal component to reduce its impact on the overall attention score. Thus, this improved transformer model can update its predictions to ensure that the amount of time between two events is properly considered when computing attention. As a result of this technical process, an improved transformer model is obtained that is able to perform tasks, such as determining whether to authorize a request, authorize a transaction, with accurate and robust contextual information.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIGS. 6A and 6B illustrate a respective classification of an attention matrix and an updated attention matrix including one or more attention values whose time components have been weighted, respectively, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
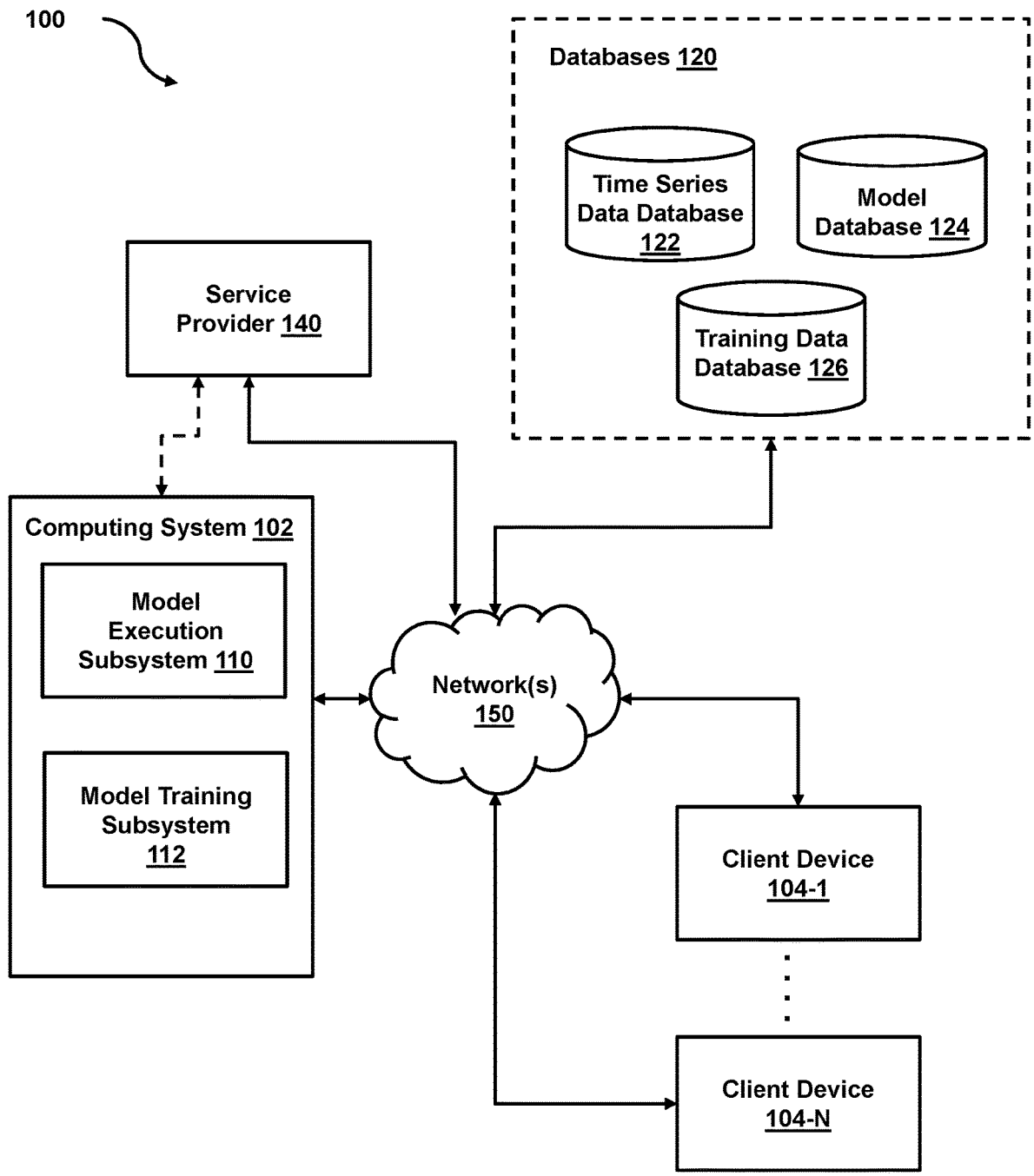
FIG. 1 shows an illustrative system for decomposing attention values into event components and temporal components, in accordance with one or more embodiments.

FIG. 1 shows an illustrative system 100 for decomposing attention values into event components and temporal components, in accordance with one or more embodiments. System 100 may include a computing system 102, client devices 104-1 through 104-N (collectively referred to interchangeably as "client devices 104"), databases 120 including a time series data database 122 and a model database 124, a service provider 140, or other components. Computing system 102, client devices 104, databases 120, service provider 140, and/or any other devices, servers, and/or systems may communicate with one another using one or more networks 150.

In some embodiments, only one client device (i.e., one of client devices 104) may be used, while in other embodiments, multiple client devices (i.e., two or more client devices 104) may be used. Client devices 104 may be associated with one or more users. Client devices 104 may be associated with one or more user accounts. For example, a client device 104 may have an account with service provider 140 or may be used to access the account with service provider 140. In some embodiments, client devices 104 may be computing devices that may receive and send data via network 150. Client devices 104 may be end-user computing devices (e.g., desktop computers, laptops, electronic tablets, smartphones, and/or other computing devices used by end users). Client devices 104 may output (e.g., via a graphical user interface) data, run applications, output communications, receive inputs, or perform other actions.

Service provider 140 may represent one or more computing systems operated by a provider of a service or services. For example, service provider 140 may refer to a social media service, a financial service, a healthcare service, an educational service, a transactional service, a utility service, and the like. In some embodiments, users may have accounts with service provider 140. The accounts enable users to access one or more services offered by service provider 140. The accounts may, in some embodiments, be secure/private. For example, users may have to input certain credentials or other information to be authorized to use the services offered by service provider 140. In some examples, users may access the services provided by service provider 140 using an application programming interface (API), a mobile application, a website, or the like running on client devices 104.

In some embodiments, users may submit authorization requests to service provider 140 via client devices 104. In some examples, the request may comprise a request to authorize a user account. In some examples, the request may comprise a request to authorize a transaction, access to a service, access to a resource, or other authorizations. In some examples, the request may be classified into a first classification (e.g., authorization is granted) or a second classification (e.g., authorization is denied). In some embodiments, the request may include, or be based on, time series data.

In some embodiments, computing system 102 may be in communication with, or form a component of, service provider 140. In other words, service provider 140 may leverage aspects of computing system 102 to respond to requests. For example, service provider 140 may route requests to computing system 102, which may analyze the requests and determine responses to the requests, which in turn may route the responses to service provider 140. As another example, service provider 140 and computing system 102 may form a single system (indicated via the dashed line). In some embodiments, the request to authorize an event may comprise a request to provide authorization for a user account based on the time series data. In some embodiments, the request may correspond to a request to approve a data transaction, a data transformation, a data transmission, or another type of event.

Computing system 102 may include a model execution subsystem 110, a model training subsystem 112, or other subsystems. Each of model execution subsystem 110 and model training subsystem 112 may be implemented using computer programming instructions executing on one or more processors. In some examples, dedicated hardware may be used to execute the instructions associated with one or more subsystems. In some examples, model execution subsystem 110 and model training subsystem 112 may be implemented using one or more cloud computing resources. For example, container instances may be provisioned (or selected if warm) to perform tasks represented by each subsystem's corresponding programming instructions.

In some embodiments, computing system 102 may include, be in communication with, facilitate the execution of, or interface with a transformer model. Transformer models may process and analyze large amounts of data through deep learning techniques. Typically, a transformer model may begin by ingesting massive datasets, which can include text, images, or other types of information. The transformer then uses this data to train itself by learning patterns, relationships, and structures within the data. One of the key features of transformer models is their use of attention mechanisms. This approach allows the transformer to focus on different parts of the input data when making predictions or generating responses. For instance, in natural language processing (NLP) applications, a transformer model may pay more attention to specific words or phrases in a sentence that are crucial for understanding the context and meaning. Another aspect of these models is their ability to handle sequential data, such as text or time series data, in a way that does not rely on the sequential processing used in other types of models. Instead, transformers can process entire sequences of data simultaneously, which often results in more efficient and effective learning. Since transformer models do not inherently capture the sequential nature of the input, positional encodings may be added to the input embeddings to provide information about the position of words in the sequence. Transformers often utilize an encoder-decoder architecture, where the encoder processes the input sequence and the decoder generates the output sequence. This architecture may be used for sequence-to-sequence tasks like machine translation and text summarization.

The training process of a transformer model typically involves adjusting the model's internal parameters to minimize the difference between its outputs and the correct answers or desired outcomes. This process, known as optimization, may rely on various algorithms. Once trained, transformer models may perform a wide range of tasks, such as language translation, content generation, image recognition, and more. In some embodiments, transformer models may be adapted to other contexts as well. For example, to predict events, transformers may analyze data, identifying patterns and relationships that may not be immediately apparent. They may do this by focusing on specific segments of the data that are more relevant for making accurate predictions. By ingesting large datasets that capture different aspects of behavior, such as many different historical events, these models can learn underlying patterns and decision-making processes. This learning may enable them to simulate or predict future events under varying conditions.

In some embodiments, model execution subsystem 110 may be configured to input time series data representing a plurality of events into a transformer model to obtain a first response to a request to authorize an event. The time series data may be stored in time series data database 122 and may be retrieved by model execution subsystem 110 in response to the request being received. For example, in response to receiving a request to authorize an event, provide another form of authentication/authorization, or perform another classification, model execution subsystem 110 may determine a user account associated with the request. The user account can be determined, for example, by analyzing information included in the request. For example, a device identifier, IP address, MAC address, or other identification mechanism may be determined about a corresponding client device (e.g., one of client devices 104) that submitted the request. In one or more examples, time series data database 122 may include a lookup table, or other index, and may identify a memory block storing time series data associated with a user account linked to the identification mechanism of the requesting client device. After determining the user account, and the memory block storing the time series data for that user account, model execution subsystem 110 may retrieve the time series data from time series data database 122.

In some embodiments, the plurality of events represented by the time series data may be respectively associated with a plurality of times and may include at least one query event occurring at a first time and a plurality of key events occurring at a plurality of second times. As an example, with reference to FIG. 2, time series data 200 may include a plurality of events 201-207. Each event occurs at a different time: event 201 occurs at time T1, event 202 occurs at time T2, event 203 occurs at time T3, event 204 occurs at time T4, event 205 occurs at time T5, event 206 occurs at time T6, and event 207 occurs at time T7.

In some embodiments, model execution subsystem 110 may be further configured to compute a plurality of respective time differences between the first time of each query event and each corresponding second time of the plurality of key events. In some examples, an amount of time between one event (e.g., $E_i$) and another event (e.g., $E_j$) may be equal (e.g., $dt_{ij}=T_i-T_j$ is equal to $dt_{(i+1)(j+1)}=T_{i+1}-T_{j+1}$). However, in some examples, the amount of time between events (e.g., $E_i$, $E_j$) may vary (e.g., $dt_{ij}=T_i-T_j$ is different from $dt_{(i+1)(j+1)}=T_{i+1}-T_{j+1}$). For instance, at least two (or more) of the plurality of respective time differences may be different. The magnitude of the time differences may vary. For example, the time difference between a first event of the plurality of events and a second event of the plurality of events may be less than or greater than another time difference between a third event of the plurality of events and a fourth event of the plurality of events. In one or more examples, two or more time differences may be equal or approximately equal (i.e., the corresponding two events occur within a threshold amount of time (e.g., less than 1 second, less than 0.1 seconds, less than 0.01 seconds, etc.) of one another).

The varying time differences between events 201-207 may relate to the type of data represented by time series data 200. In general, time series data may be evenly spaced (uniform) or unevenly spaced (non-uniform). Evenly spaced time series data, for example, may be obtained when a sample is captured at a predefined cadence (e.g., a heart rate monitor that takes a sample measurement event second). Unevenly spaced time series data, for example, may be obtained when a particular trigger or event is detected, resulting in a sample being captured. Some examples of unevenly spaced time series data include seismic data or other environmental data, signal processing, financial data, transaction data, and the like.

Additionally, the magnitude of each event may depend on the type of data being analyzed. For example, seismic time series data may have one unit of measure (e.g., magnitude). As another example, financial data may have units of dollars, euros, or other currencies. As yet another example, signal processing data may have units of amplitude, frequency, or other units. Thus, the particular units are not to be construed as limiting and may be arbitrary.

In some embodiments, events 201-207 may include one or more query events and a plurality of key events. A query may be a representation that is used to score how much focus should be put on other parts of the input data. A query may represent a current event that a transformer model is considering (e.g., $E_i$). Each key may correspond to one of the other events (e.g., $E_j$ where i≠j) and may be weighted based on the focus the transformer model places on each key relative to the query. In some embodiments, a first event in the input data may be projected into a query space to generate the query event and each second event may be projected into a key space to generate each key event. Each input data element, such as an event, may be represented as a vector. To project the input data into a query space or key space, the model may apply a learned linear transformation, such as a matrix multiplication, where the input vectors may be multiplied by a weight matrix. These weights, learned during the training process, may be specific to the task the model is trained for. The result of this multiplication may be a set of vectors, each representing a query. Each query vector corresponds to an element in the input data and may contain information about that element in a form suitable for the attention mechanism of the transformer. The process may be repeated to generate keys using different learned weight matrices. The query vectors may then be used in the attention mechanism, where they interact with key vectors to determine the focus level on each part of the input. In some embodiments, model execution subsystem 110 may treat each event within input data as the query in turn while treating the remaining events as keys.

Returning to FIG. 1, model execution subsystem 110 may be configured to cause a transformer model to execute one or more tasks, transformations, or other operations. In some embodiments, model execution subsystem 110 may be configured to retrieve a transformer model from model database 124 and may facilitate the transformer model's execution of one or more operations. In some embodiments, the transformer model may be used to generate, based on the time series data, the first attention matrix. The transformer model may further be used to classify, based on the first attention matrix, the time series data into a first class. In some examples, the time series data being classified into the first class may indicate that the request to authorize the event was denied.

In some embodiments, model execution subsystem 110 may be configured to obtain, from the transformer model, a first attention matrix from which the first response was determined. The first attention matrix may include a first plurality of attention values. In one or more examples, each attention value may include a time component and an event component.

In some embodiments, the transformer model may be used to generate, based on the time series data, the first attention matrix. The transformer model may further be used to classify, based on the first attention matrix, the time series data into a first class. For example, the first response may indicate that the request was denied. In this example, the time series data being classified into the first class may indicate that the request to authorize the event was denied.

In some aspects, the events represented by the time series data may relate to a person, an account, a service, or another entity's behavior over time. The transformer model may be trained to model and predict events (e.g., actions, activities, transactions, or other events) associated with an entity based on a sequence of events performed by the person in the past (e.g., the time series data). In some embodiments, the transformer model may be configured to generate event embeddings for events, such as events 201-207 of FIG. 2. Each event embedding may encapsulate information such as a time and location of an event associated with the entity, other related entities, its type or category (e.g., credit card transaction, default, cancellation of a card, credit check, etc.), and other relevant contextual details. The transformer model may perform a transformation on each embedding and may generate an attention matrix using the transformations.

In some examples, generating attention values within the attention matrix may involve adjusting the transformations according to respective time differences between corresponding pairs of events. For example, the events may include a person defaulting on a payment, making various other payments, checking their account, chatting with customer service, and performing other actions. In some embodiments, a first attention value may represent a similarity between a first embedding (e.g., representing the person defaulting on a payment) and a second embedding (e.g., representing the person making a different payment), adjusted for a first time difference between the person defaulting on the payment and making the different payment. A second attention value may represent a similarity between the first embedding (e.g., representing the person defaulting on a payment) and a third embedding (e.g., representing the person checking their account), adjusted for a second time difference between the person defaulting on the payment and checking their account, and so on.

In some embodiments, model execution subsystem 110 may update the transformer model using the attention values so that the transformer model learns to place less weight on events that occurred farther apart in time and to rely more heavily on events that occurred closer together in time. As another example, the transformer model may be updated to de-emphasize certain types of events, certain pairs of events, or other information. This updating enables transformer models to adapt to contexts in which understanding the relative timing of data is crucial to a transformer's ability to model the data.

Model execution subsystem 110 may be configured to generate the first attention matrix. In some embodiments, model execution subsystem 110 may be configured to generate the first attention matrix by generating a plurality of event embeddings corresponding to a plurality of events. The plurality of events may include a query event associated with a first time and a plurality of key events associated with a plurality of second times.

In some embodiments, model execution subsystem 110, via a transformer model or other artificial intelligence model, may be configured to receive or generate event embeddings. Event embeddings may be representations of events in a continuous vector space. Event embeddings may be similar to word embeddings in NLP, where words are represented as dense vectors in a continuous space, capturing semantic relationships between words. In the context of event data or sequences, event embeddings may encode information about events, their relationships, and contextual dependencies. These embeddings may be created using various techniques and may be used in sequential data analysis, recommendation systems, time series analysis, and other applications dealing with event sequences. In some embodiments, an event embedding may be generated using sequential models (e.g., Recurrent Neural Networks (RNNs), transformers, etc.) Models such as RNNs or transformer architectures may learn embeddings from event sequences by processing them sequentially. These models may capture dependencies between events and generate embeddings based on the sequence context. Temporal Convolutional Networks (TCNs) use convolutional operations to learn event embeddings by considering temporal dependencies in event sequences. Event data may also be represented as a graph, where events are nodes and relationships between events are edges. Graph embedding techniques may aim to learn representations for events based on their connectivity and interactions in the graph. Event embeddings may capture various properties of events, such as event types, temporal relationships, contextual information, and dependencies among events in a sequence. These embeddings may be used in downstream tasks like event prediction, anomaly detection, recommendation systems, and more, providing a compact and meaningful representation of event data.

Figure 2:
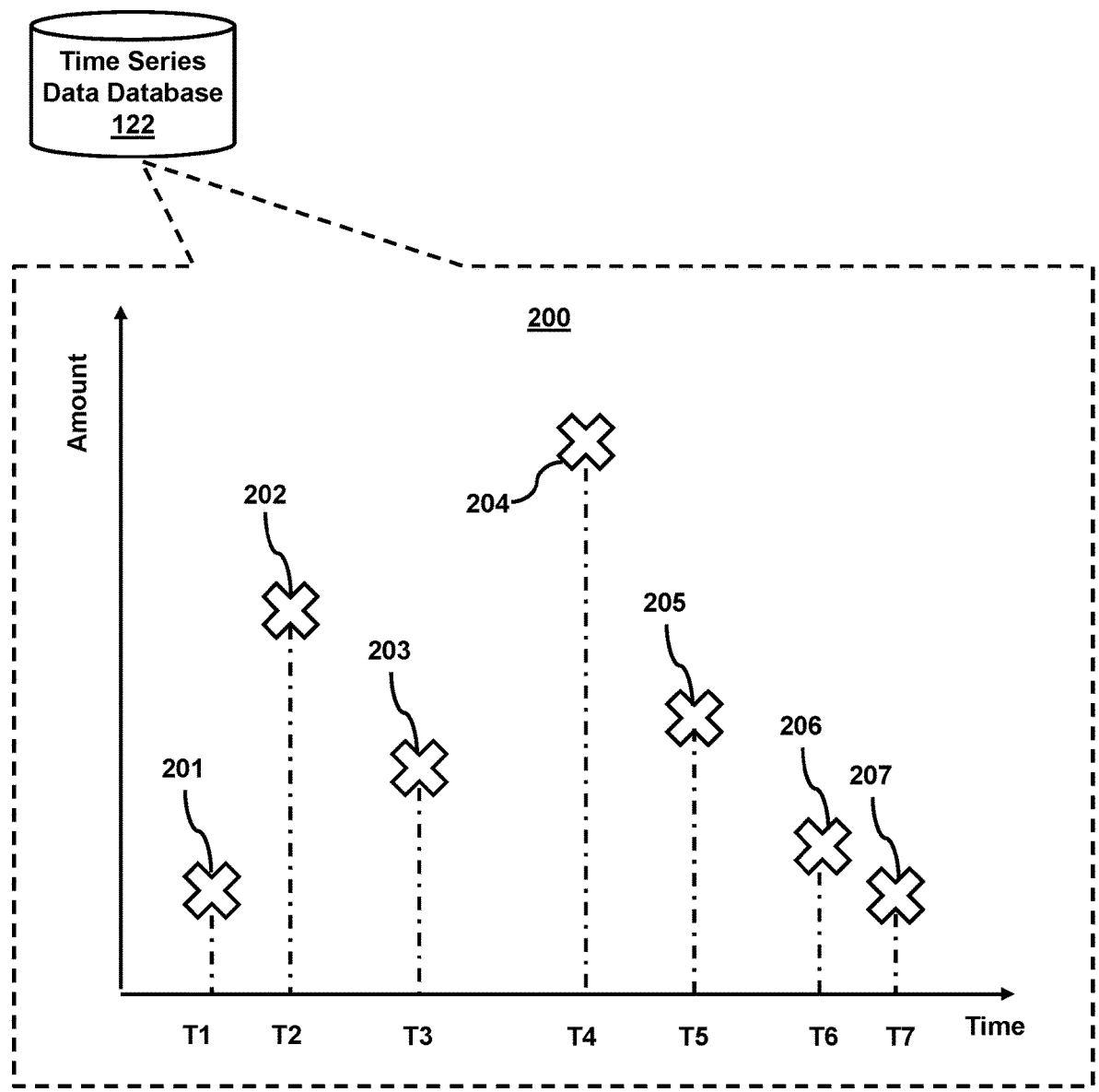
FIG. 2 illustrates example time series data, in accordance with one or more embodiments.

Model execution subsystem 110, itself or via a transformer model, may generate event embeddings for the input events (e.g., events 201-207 of FIG. 2). The input events may include a first event (e.g., a query event) and second events (e.g., key events). The query event may be associated with a query event embedding, and the key events may be associated with key event embeddings. For example, the query event and each key event may be converted into a high-dimensional vector using a learned embedding layer of a transformer model. This initial embedding may capture the essential features of each event in a format the transformer model can process. Once the initial embeddings are created, the transformer model may apply separate linear (or other) transformations to these embeddings to produce the query embedding and the key embeddings. These transformations may be facilitated by learned weights that are specific to each type of vector, as previously discussed. For the query and key vectors, these transformations may be designed to prepare the embeddings for the attention mechanism. The query embeddings may represent the elements for which the model is trying to determine relevance, while the key embeddings may correspond to the elements against which the query is compared. The transformer model may then use these query and key embeddings in the attention mechanism, as will be discussed in detail below. In some embodiments, the query and key embeddings may represent, for a corresponding event, how that event would fit into a sequence of other events. For example, the embeddings may represent the context in which each corresponding event occurs.

In some embodiments, an event embedding may be generated for each event included in the time series data. For example, an event embedding may be generated for each of events 201-207 of FIG. 2. In this example, a first event embedding may correspond to a first event (e.g., event 201). This first event may correspond to a query event qr; however, other events may also or alternatively function as query events. Event embeddings may also be generated for events 202-207. In these examples, events 202-207 may correspond to key events, and the event embeddings for events 202-207 may represent key event embeddings. In some embodiments, each event embedding may include values that represent various aspects and features of the corresponding event, capturing both explicit and implicit characteristics that define the event. The embeddings may be high-dimensional vectors where each dimension may encode different attributes or nuances of the corresponding event. As an illustrative example, each event embedding may encapsulate information such as the time and location of an event associated with a person (e.g., a member of an organization), its participants, its type or category (e.g., credit card transaction, default, cancellation of a card, credit check, etc.), its account, another entity, and other relevant contextual details. For example, in each embedding of an event, certain dimensions may implicitly encode the significance or impact of the event based on how similar events have been perceived or categorized in training data used to train the transformer model. Another dimension may encode relationships between the events, such as causality or correlation, learned through the transformer model's exposure to sequences or clusters of events in the data. In some embodiments, plotting the event embeddings in an embedding space (e.g., a high-dimensional space) may reveal that similar events are plotted close to each other while events with vastly different characteristics are plotted farther apart. In some embodiments, the event embeddings may include different event embeddings or event embeddings having different dimensions.

In one or more examples, model execution subsystem 110 may be configured to calculate a plurality of dot products of a query event embedding associated with a query event and each of a plurality of key event embeddings associated with a plurality of key events. In some embodiments, model execution subsystem 110 may input the event embeddings into the transformer model. The transformer model may be trained to perform a transformation (or transformations) on the event embeddings. In particular, model execution subsystem 110 may be configured to feed the embeddings into the multiple layers of the transformer model for further processing.

Each layer in the transformer model may be designed to perform a series of transformations on these embeddings, enabling the transformer model to extract and refine the information encoded in the input time series data (e.g., time series data 200 of FIG. 2). An attention mechanism of the transformer model may dynamically weigh the importance or relevance of different parts of the input sequence. Unlike traditional models that process data in a fixed manner, the attention mechanism in transformer models may selectively focus on specific elements of the input sequence that are more relevant for a given task. This ability to focus selectively allows the transformer model to handle complex dependencies and relationships within the data. For example, the attention mechanism can weigh the influence of each event in relation to others, regardless of their position in the sequence, enabling a more nuanced understanding and processing of the input. Furthermore, as the embeddings pass through successive layers of the transformer model, each layer may refine and reshape these representations, building upon the transformations performed by previous layers. This layered processing allows the transformer model to capture and encode increasingly abstract and complex relationships within the data. By the time the embeddings have passed through all the layers, they have been transformed into a representation of the original input that captures a deep understanding of the data.

Figure 3A:
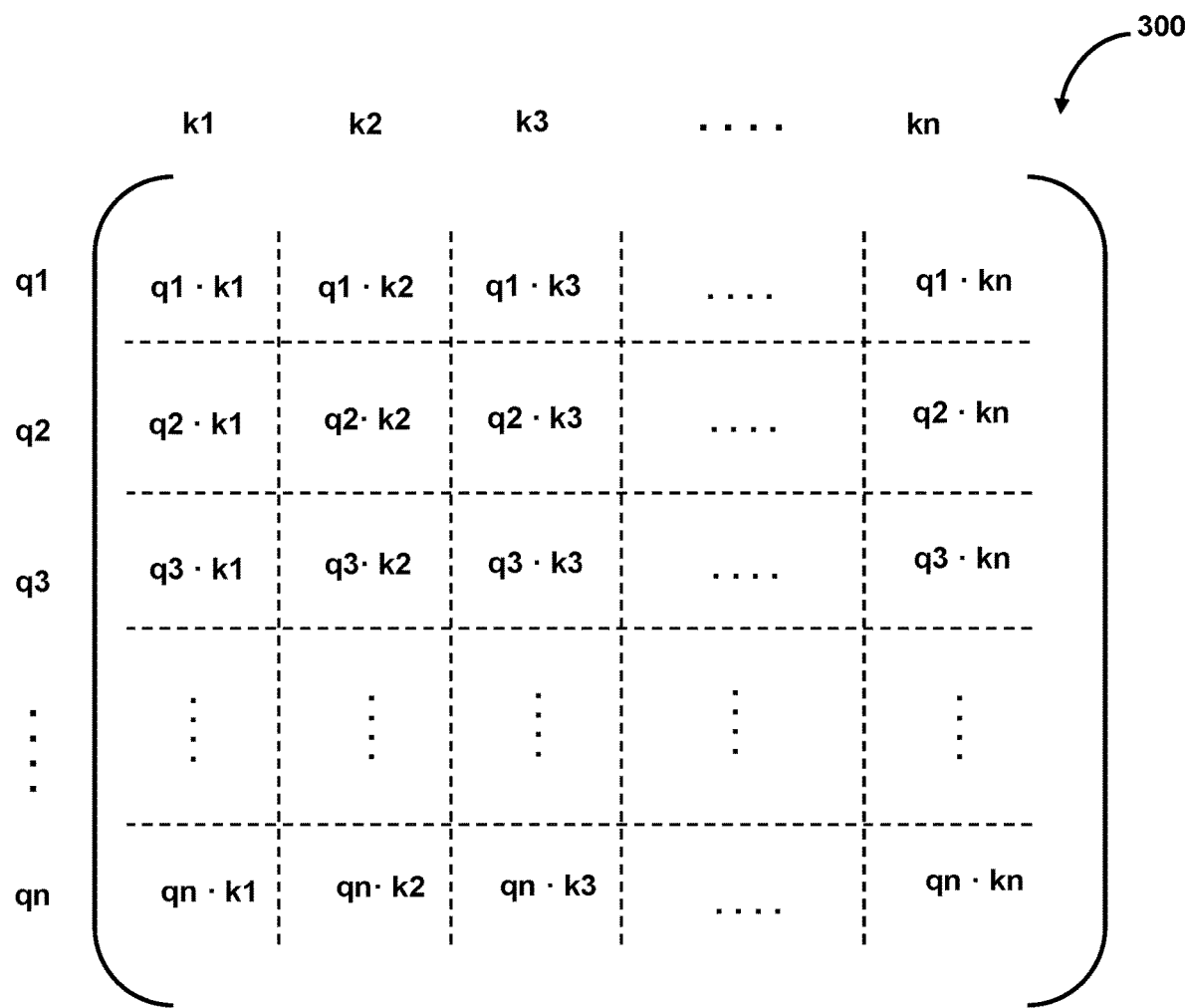
FIGS. 3A-3B illustrate an event embedding matrix and a time difference matrix, respectively, in accordance with one or more embodiments.

In some embodiments, the transformer model may perform a transformation on the embeddings. A transformation may refer to various operations applied to the input event embeddings through the layers of the transformer model. Transformations may involve linear transformations, activation functions, or other functions. In some embodiments, the transformer model may perform a transformation on the embedding involving dot products. For example, the transformer model may be trained to take a dot product of a first event's corresponding first event embedding (e.g., query event embedding $q_1$) with each of the second events corresponding second event embeddings (e.g., key event embeddings $k_1$-$k_7$). As an example, with reference to FIG. 3A, matrix 300 may include rows representing query embeddings $q_1$-$q_n$ and columns representing key embeddings $k_1$-$k_n$. The number of query embeddings and key embeddings may depend on a quantity of events in the time series data. For example, with respect to time series data 200, which includes seven events $E_1$-$E_7$, matrix 300 would include seven rows and seven columns. Furthermore, as each event can serve as a query event and a key event, depending on which event is analyzed as the query event, query event embeddings $q_i$ may be the same or similar to key event embeddings $k_j$ if i=j.

A dot product refers to an operation that takes two equal-length sequences of numbers (usually coordinate vectors) and returns a single number. This operation involves multiplying corresponding elements of the vectors and then summing those products. The dot product thus transforms a pair of vectors into a single scalar value. The dot product is used by the transformer to compute the similarity between query and key embeddings (e.g., $q_i \cdot k_j$). This similarity score is crucial to determining how much attention or weight should be given to different events of the input events.

In some embodiments, the transformation of the embeddings may generate an attention matrix, such as matrix 300 of attention values (e.g., $q_i \cdot k_j$). Attention values (i.e., $q_i \cdot k_j$ for i, j=1, 2, . . . , n) may refer to the importance or weight assigned to each key event embedding relative to a query event embedding. An attention mechanism in the transformer model may calculate attention scores that determine how much focus each event should receive concerning other events in the same input. For example, for each event in the input, the model may calculate scores by performing a dot product between the event's embedding and the embeddings of other events in the input. These scores may represent the importance or relevance of other events relative to the current event.

To generate the attention matrix, the transformer may take the dot product of the query embeddings with the key embeddings. By multiplying corresponding elements of these embeddings and summing the results, the transformer model computes a scalar value for each query-key pair. The resulting values from these dot product operations form the attention matrix (e.g., matrix 300). As an example, each entry in matrix 300 may represent the attention score or the degree of relevance between a specific query and a key. Each value may further indicate how much attention the query event should pay to that particular key event. The attention scores may be normalized, for example, using a SoftMax function, to ensure that they form a valid probability distribution. For example, a SoftMax function may transform values within a vector into values that sum up to one. Thus, the SoftMax function converts each attention value into a format representing a relative relevance of a corresponding pair of events to each other. This normalization step may allow the transformer to focus more clearly on the most relevant parts of the input data.

As an illustrative example, a first query event corresponding to event 201 of FIG. 2 may represent when a person defaulted on a credit card payment. The key events, such as events 202-207, may include the person making various payments, checking their account, chatting with customer service, and performing other actions. In some embodiments, the first entry of matrix 300 of FIG. 3A may represent a similarity between the first query embedding $q_1$ (e.g., representing the person defaulting on a payment) and a first key embedding $k_1$ (e.g., also representing the person defaulting on a payment). For example, $q_1 \cdot k_1 = 1$ if $q_1$ and $k_1$ both represent event 201. A second entry in matrix 300 may represent a similarity between the first query embedding $q_1$ (e.g., representing the person defaulting on a payment) and a second key event embedding $k_2$ (e.g., representing the person making a different payment) corresponding to event 202 of FIG. 2. A third entry of matrix 300 may represent a similarity between the first query embedding $q_1$ (e.g., representing the person defaulting on a payment) and a third key embedding $k_3$ (e.g., representing the person checking their account) corresponding to event 203. Another entry of matrix 300 may represent a similarity between a second query event embedding $q_2$ (e.g., representing the person making a different payment) corresponding to event 202 of FIG. 2 and a first key event embedding $k_1$ (e.g., representing the person defaulting on a payment).

In some embodiments, model execution subsystem 110 may be configured to determine a plurality of respective time differences between the first time of the query event and each corresponding second time of the plurality of key events. For example, an amount of time $dt_{ij}$ between a first event (e.g., $E_i$) occurring at time $T_i$ and a second event (e.g., $E_j$) occurring at time $T_j$. The first plurality of attention values may be computed based on an aggregation of the plurality of dot products with a function of the plurality of respective time differences.

In some embodiments, time may be represented as a number of days since a common start point (e.g., Jan. 1, 1990). In some embodiments, time may be represented in a month, day, and year format. In some embodiments, time may include a time of day. In some embodiments, another format of time may be used. In some embodiments, multiple formats of time may be used at different steps and model execution subsystem 110 may convert the times between formats.

Figure 3B:
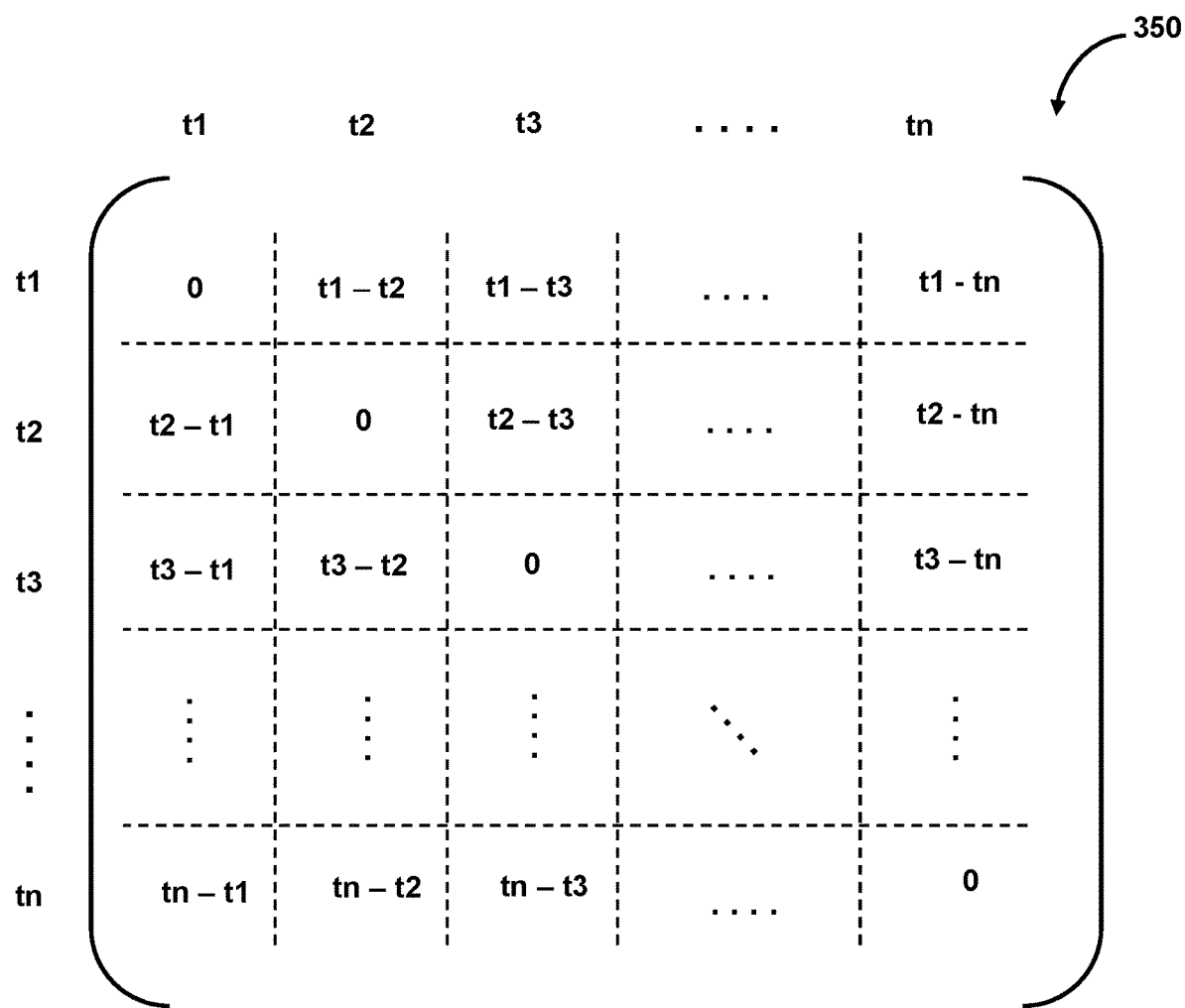

In an example, model execution subsystem 110 may calculate a time difference $dt_{ij} = T_i - T_j$ between when a query event and corresponding key events occurred. For example, as seen with reference to FIG. 3B, a matrix 350 of respective time differences is illustrated. Each entry of matrix 350 represents a time difference $dt_{ij}$ between a time $T_i$ when a given query event occurred and a time $T_j$ when a given key event occurred. For example, a first entry in matrix 350, corresponding to row $t_1$ and column $t_1$, may be calculated by calculating a time difference between a time $T_1$ that a first event occurred (e.g., event 201 corresponding to query event embedding $q_1$) and a time $T_1$ that a first key event occurred (e.g., event 201 corresponding to key event embedding $k_1$). In this example of FIG. 3B, because the query event and the key event refer to the same event (i.e., event 201), the value of the time difference is zero. Similarly, the remaining diagonal terms of matrix 350 are also equal to zero. The off-diagonal elements may be non-zero. For example, the second entry in matrix 350, corresponding to row $t_1$ and column $t_2$, may be calculated by calculating a time difference between a time $T_1$ that the first event occurred (e.g., event 201 corresponding to query event embedding $q_1$) and a time $T_2$ that a second key event occurred (e.g., event 202 corresponding to key event embedding $k_2$). This time difference, $dt_{12} = T_1 - T_2$, may have a non-zero value. In some embodiments, matrix 350 may have symmetrical (e.g., $dt_{ij} = dt_{ji}$) values. In some embodiments, matrix 350 may be symmetric with respect to a magnitude of the time differences (e.g., $|dt_{ij}| = |dt_{ji}|$).

In some embodiments, model execution subsystem 110 may be configured to generate, or cause the transformer model to generate, the attention values by aggregating the transformations (e.g., dot products) in matrix 300 and the respective time differences (e.g., matrix 350). For example, model execution subsystem 110 may adjust the transformation based on the respective time differences such that each attention value accounts for the corresponding respective time difference. For example, model execution subsystem 110 may add each respective time difference to each corresponding dot product. For example, model execution subsystem 110 may add, to a first dot product of a first query event embedding and a first key event embedding, a first time difference between the first query event and the first key event. If the time difference is zero, then nothing is added to the corresponding dot product. Model execution subsystem 110 may repeat this process for each pair of events.

In some embodiments, model execution subsystem 110 may subtract each respective time difference from each corresponding dot product. In some embodiments, model execution subsystem 110 may perform the aggregation step on the non-normalized version of each dot product. For example, model execution subsystem 110 may perform the aggregation step on each non-normalized attention value and may then normalize the attention values following the aggregation step (e.g., using a SoftMax function). After model execution subsystem 110 has aggregated the respective time differences and the dot products, each attention value may indicate a weight of a corresponding key event of the plurality of key events relative to the query event, accounting for a respective time difference between the first time and a corresponding second time.

Figure 4:
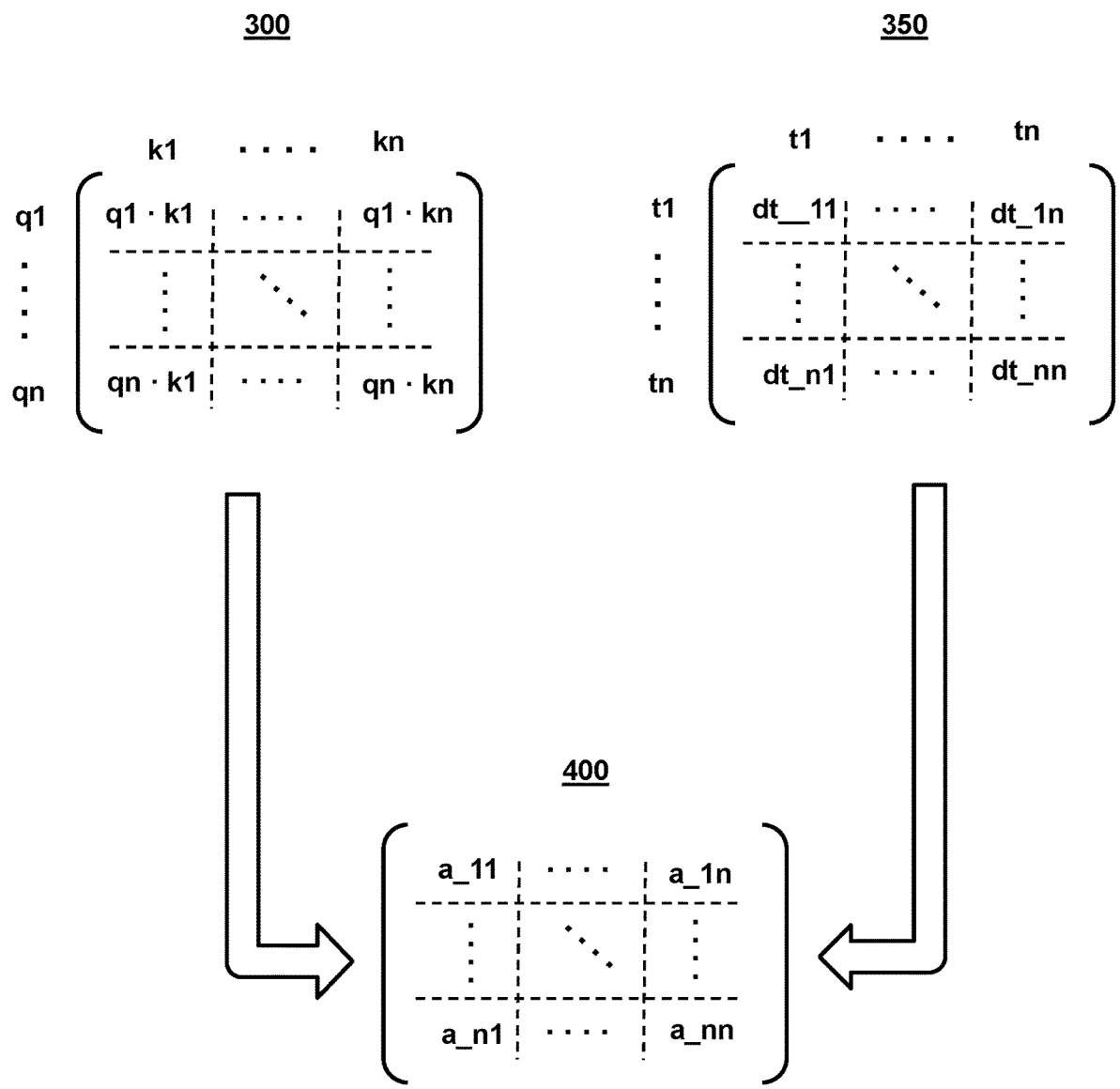
FIG. 4 illustrates an attention matrix formed based on the event embedding matrix and the time difference matrix, in accordance with one or more embodiments.

In some embodiments, generating the attention values may involve aggregating a function of the respective time differences and the transformation (e.g., dot products). As an example, with reference to FIG. 4, matrix 300 and matrix 350 may be aggregated to obtain attention matrix 400 comprising attention values $a_{ij}$, where $i, j = 1, 2, \ldots, n$. For example, the function may be an exponential function. In one or more examples, the attention value, without accounting for time difference, for a given query-key event pair may be computed using Equation 1:

$$a_{ij} = \frac{\exp(q_i \cdot k_j)}{\sum_{ij} \exp(q_1 \cdot k_j)}. \qquad \text{Equation 1}$$

In this example, attention values $a_{ij}$ are the transformation of the dot products $q_i \cdot k_j$. The addition of the respective time differences enables the transformer model to contextualize each event in the time series data. In some embodiments, the time differences may be input into a function $f$, and this value is used in the aggregation with the dot product, as seen below with respect to Equation 2, to obtain attention values $a_{ij}$ of attention matrix 400.

$$a_{ij} = \frac{\exp(q_i \cdot k_j + f(dt_{ij}))}{\sum_{ij} \exp(q_i \cdot k_j + f(dt_{ij}))}. \quad \text{Equation 2}$$

In some examples, the function $f$ may be an exponential function, such as an exponential decay function. For example, an exponential decay function may include higher values for smaller time differences between times of corresponding events and lower values for larger time differences between times of corresponding events. The transformation may be adjusted by adding the exponential decay function to the dot products so that attention values for events that are closer together in time are increased by a greater amount than attention values for events that are farther apart in time. Aggregating the transformation and the respective time differences may thus involve adding the exponential decay function of the respective time differences to the transformation, as expressed by Equation 2.

In some embodiments, the function may be an exponential growth function. An exponential growth function may include lower values for smaller time differences between times of corresponding events and higher values for larger time differences between times of corresponding events. The transformation may be adjusted by subtracting the exponential growth function from the dot products so that attention values for events that are farther apart in time are decreased by a greater amount than attention values for events that are closer together in time. Aggregating the transformation and the respective time differences may thus involve subtracting the exponential growth function of the respective time differences from the transformation. In some embodiments, another function or a combination of functions may be used to adjust the transformation.

Figure 5A:
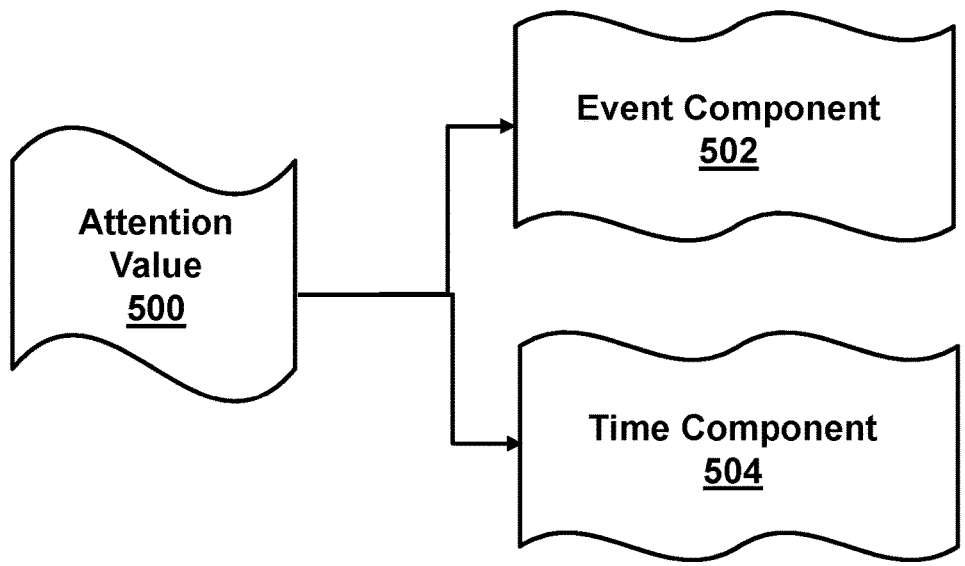
FIGS. 5A and 5B illustrate an attention value decomposed into an event component and a time component, and an attention value decomposed into an event component and a time component that includes a weight applied thereto, respectively, in accordance with one or more embodiments.

As mentioned above, each attention score may include an event component and a time component. As an example, with reference to FIG. 5A, each attention value 500 (e.g., one of attention values $a_{ij}$) can be decomposed into an event component 502 and a time component 504. Event component 502 may be formulated based on the dot product of a query event embedding and a key event embedding (e.g., $\exp(q_i \cdot k_j)$). Event component 502 can represent how much attention value 500 is based on the dot product of the query event embedding and the key event embedding. In other words, event component 502 may represent an amount of influence or "attention" the transformer model imparts to the dot product of the query event embedding and the key event embedding.

Time component 504 may be formulated based on the function of the respective time difference between the corresponding query and key events (e.g., $\exp(f(dt_{ij}))$). Time component 504 can represent how much attention value 500 is based on the function of the respective time difference between the corresponding query and key events. In other words, time component 504 may represent an amount of influence or "attention" the transformer model imparts to the function of the respective time difference between the query event and the key event.

In some embodiments, model execution subsystem 110 may be configured to identify, or facilitate the transformer model identifying, one or more attention values from the first plurality of attention values that fail to satisfy a threshold condition. In some examples, the threshold condition being satisfied comprises the time component of an attention value being greater than or equal to a threshold time component. In some examples, the threshold condition being satisfied comprises the event component being less than a threshold event component.

As shown above with respect to Equation 2, the attention values produced by the transformer model can be decomposed into event component 502 calculated based on the dot product of the query event embedding with the key event embeddings (e.g., $\exp(q_i \cdot k_j)$) and time component 504 calculated based on the function of the time difference between the time of the query event and the time of the key event (e.g., $\exp(f(dt_{ij}))$). Therefore, model execution subsystem 110 can derive, for each attention value in attention matrix 400, a respective event component and time component. Model execution subsystem 110 may then identify which attention values satisfy the threshold condition based on the event components and time components.

In some embodiments, to identify the one or more attention values, model execution subsystem 110 may be configured to determine, from the first plurality of attention values, a subset of attention values. The subset of attention values may include attention values that are greater than or equal to a threshold attention value. In some examples, an attention value (e.g., attention value 500) that is greater than or equal to the threshold attention value may indicate that a provided response (e.g., the first response) was generated based on the subset of attention values. In other words, the prediction made by the transformer model may be influenced more by these attention values. In the context of NLP transformers, this would relate to the transformer models predicting a next word or response to an input prompt based on a specific subset of text tokens from the input prompt.

In some embodiments, model execution subsystem 110 may be configured to determine the event component and the time component for every attention value in attention matrix 400. However, to save computing resources, it may be more efficient to decompose the subset of attention values instead of all of the attention values. In some embodiments, model execution subsystem 110 may be configured to compare the time component of each attention value from the subset of attention values to a threshold time component to determine the one or more attention values. In some examples, the threshold condition being satisfied may further comprise determining that the time components of attention values (e.g., time component 504) are less than the threshold time component. Identifying the attention values that most significantly impact the transformer model's outputs enables model execution subsystem 110 to determine whether any of these attention values should not have had that much influence and modify those attention values to have less influence.

In some embodiments, the transformer model may output a classification result based on time series data, such as time series data 200 of FIG. 2. As an example, with reference to FIG. 6A, attention matrix 600 may be input into a classifier 610, which can be trained to output a classification result. The classification result may indicate whether attention matrix 600 (derived from time series data) is to be classified into a first class 612 or a different class. If there are only two classes, classifier 610 can be considered a binary classifier; however, classifier 610 may be a multi-class classifier trained to classify attention matrix 600 into one of three or more classes. In some embodiments, classifier 610 may be a part of the transformer model. For example, the transformer model may generate attention matrix 600 and input attention matrix 600 into its classification component (e.g., classifier 610). In some examples, where the time series data input to the transformer model is associated with a request, the classification result can indicate whether the request was granted or denied. In the example of FIG. 6A, the classification result, first class 612, may indicate that the request has been denied.

Figure 5B:
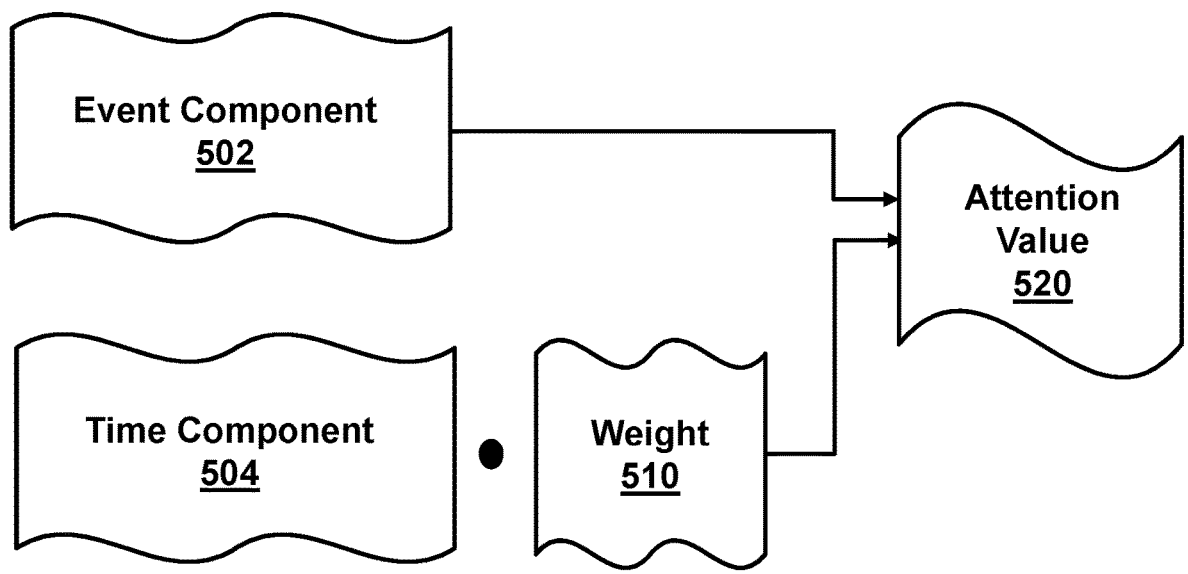

In some embodiments, model execution subsystem 110 may be configured to modify the one or more attention values included within the subset of attention values to satisfy the threshold condition. In some examples, modifying the one or more attention values comprises applying a weight to the one or more attention values. The weighting can modify the one or more attention values such that the time component of each of the one or more attention values is (or becomes) less than the threshold time component. In some embodiments, the weight may be applied to the attention value (e.g., attention value 500 of FIG. 5A). However, alternatively, the weight may be applied to time component 504. For example, as seen with reference to FIG. 5B, a weight 510 may be applied to time component 504. Weight 510 may reduce the influence time component 504 has on the resulting attention value, attention value 520. In some cases, this may cause attention value 520 to be reduced, as compared to attention value 500 of FIG. 5A.

In one or more examples, attention value 520 may satisfy the threshold condition. For example, the product of weight 510 and time component 504 may be less than the threshold time component. In one or more examples, the modification of time component 504 may cause attention value 520 to reduce to be less than a threshold attention value, indicating that attention value 520 does not impact the resulting prediction of the transformer model. In some embodiments, attention value 520 may, after application of weight 510, still fail to satisfy the threshold condition. Model execution subsystem 110 may be configured to further adjust weight 510 until it is determined that the threshold condition has been satisfied.

In some embodiments, model execution subsystem 110 may be configured to generate, using the transformer model, or cause the transformer model to generate, a second attention matrix comprising a second plurality of attention values including the one or more attention values in response to the one or more addition values being modified to satisfy the threshold condition. By modifying the attention values that previously failed to satisfy the threshold condition, the transformer model may be able to provide improved results that de-emphasize attention values influenced by their respective time components more than desired. For example, with reference to FIG. 6B, attention matrix 602 may correspond to attention matrix 600 after the one or more attention values were modified (e.g., such that the attention values satisfy the threshold condition).

In some embodiments, attention matrix 602 may be input to classifier 610 to obtain a classification result. For example, the classification result may indicate that the time series data input to the transformer model has been classified into a second class 614 different from first class 612. In some cases, second class 614 may indicate that the request was granted as opposed to first class 612, which may indicate that the request was denied. Therefore, the transformer model can improve its results by providing temporal context to its predictions.

In some embodiments, model execution subsystem 110 may be configured to update the first response to a second response indicating that the request has been granted based on the second plurality of attention values. As mentioned previously, model execution subsystem 110 may be configured to classify, using the transformer model, and based on the first attention matrix (e.g., attention matrix 600), the time series data into a first class (e.g., first class 612) indicating that the request has been denied. In these examples, model execution subsystem 110 may generate the first response based on the time series data being classified into first class 612. For instance, the first response to the request may have indicated that the request was denied.

In some embodiments, model execution subsystem 110 may be configured to reclassify the time series data into a second class based on the second attention matrix. In one or more examples, classifying the time series data into the second class may indicate that the request has been granted. For example, after modifying attention values from the attention matrix (e.g., attention matrix 602), the time series data may be classified into second class 614 indicating that the request was granted. Model execution subsystem 110 may generate a second response—different from the first response—based on the time series data being classified into second class 614. For instance, the second response to the request may have indicated that the request was granted.

Figure 7:
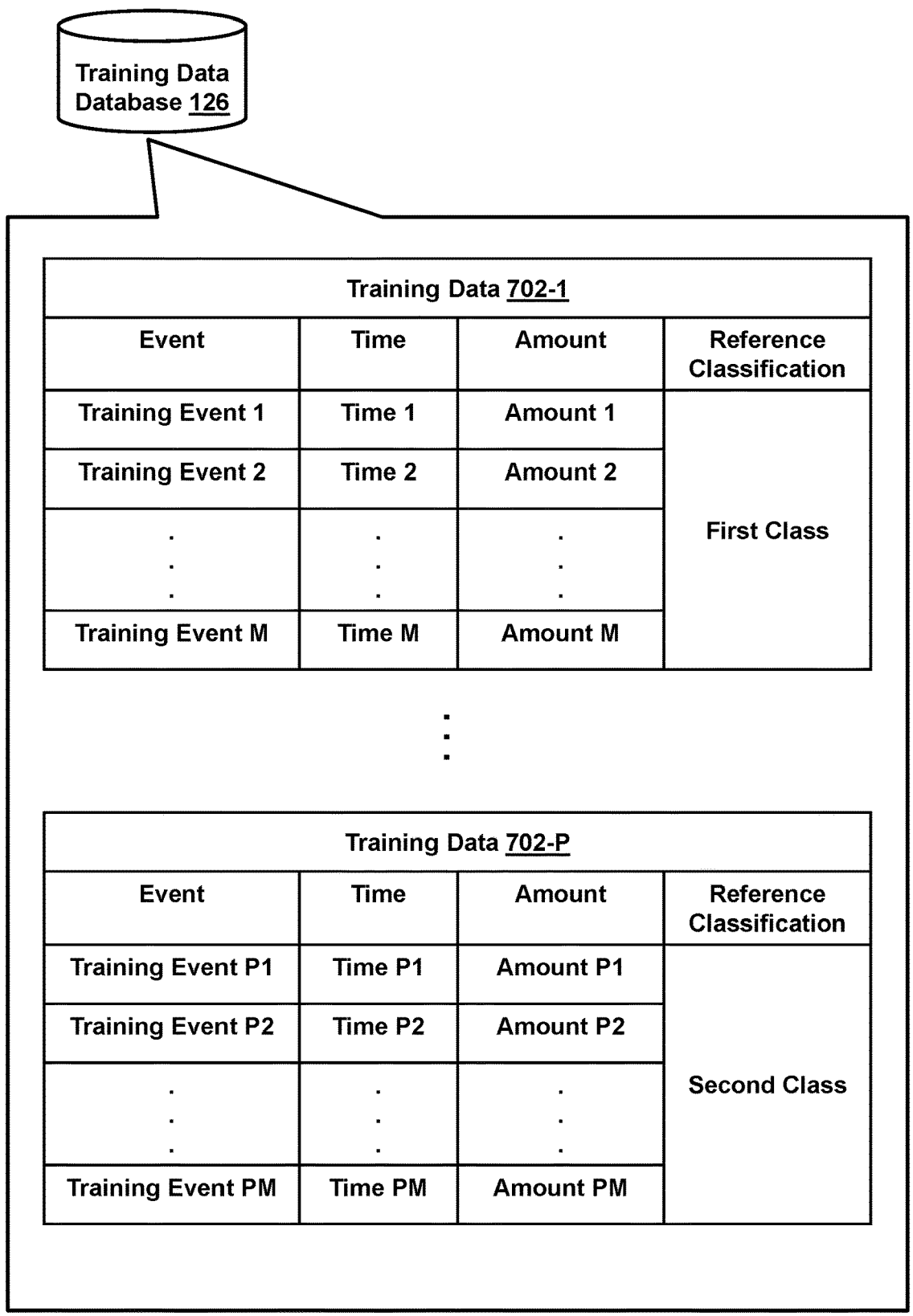
FIG. 7 illustrates example training time series data used to train a transformer model, in accordance with one or more embodiments.

Returning to FIG. 1, model training subsystem 112 may be configured to train the transformer model to generate attention values based on time series data. In one or more examples, the transformer model can be trained using training data. In some examples, the transformer model to be trained may be retrieved from model database 124. As an example, with reference to FIG. 7, model training subsystem 112 may be configured to retrieve training time series data 702-1 through 702-P (collectively referred to as "training time series data 702") from training data database 126. Each of training time series data 702 may represent a set of training events. For example, training time series data 702-1 may represent training events 1-M, occurring at times 1-M, and having amounts 1-M (e.g., values, frequencies, amplitudes, etc.). Training time series data 702-P may represent training events P1-PM, occurring at times P1-PM, and having amounts P1-PM (e.g., values, frequencies, amplitudes, etc.).

Training time series data 702 may be derived from actual time series data, such as the time series data stored in time series data database 122. Training time series data 702 may also be synthetic training data generated using one or more artificial intelligence models, such as a generative model. In one or more examples, training time series data 702 may include training data derived from actual time series data as well as training data generated by one or more generative artificial intelligence models.

Training time series data 702 may represent a plurality of sets of training events. For example, training time series data 702-1 may represent a first set of training events (i.e., training events 1-M), and training time series data 702-P may represent a second set of training events (i.e., training events P1-PM). Each set of training events may include one or more training query events, each associated with a given first time, and a plurality of training key events associated with a plurality of second times. For example, training event 1 of training time series data 702-1 may be a query event occurring at time 1. As another example, training event 2 of training time series data 702-1 may be a key event occurring at time 2. For each set of training time series data 702, the transformer model can be used to generate a plurality of training event embeddings. For example, training event embeddings may be generated for each of training events 1-M. The training event embeddings may include a training query event embedding corresponding to the training query event and a plurality of training key event embeddings corresponding to the plurality of training key events. Using the transformer model, a transformation may be executed to the plurality of training event embeddings. The transformation may include a plurality of dot products formed by calculating a dot product of the training query event embedding with each of the plurality of training key event embeddings. In some embodiments, model training subsystem 112 may be configured to generate a matrix, similar to matrix 300, including a plurality of dot products computed by calculating the dot product of each query event embedding with each key event embedding. Model training subsystem 112 may be further configured to determine a plurality of respective time differences between the first time of the training query event and each corresponding second time of the plurality of training key events. For example, a time difference between training event 1 and training event 2 may be $dt_{12}=T_1-T_2$. In some embodiments, model training subsystem 112 may be configured to generate a training time difference matrix, similar to matrix 350, for each pair of training events in training time series data 702-1. A similar process may be performed for pairs of training events in training time series data 702-P (and any other training data).

In some embodiments, model training subsystem 112 may be configured to generate, or cause the transformer model to generate, a plurality of training attention values by aggregating, with the plurality of dot products, a function of the plurality of respective time differences, as illustrated by Equation 2. In one or more examples, each training attention value can indicate a weight of a corresponding training key event in relation to the training query event. Furthermore, each training attention value may account for a respective time difference. In some embodiments, a classification of the set of training events may be determined based on the plurality of training attention values. For example, the attention matrix generated from training time series data 702-1 may be used by the transformer model (e.g., classifier 610 of FIG. 6A) to determine a predicted classification result. The predicted classification result may represent a class of a set of classes that the time series data can be classified into. For example, the set of classes may include a first class (e.g., first class 612 of FIG. 6A) and a second class (e.g., second class 614 of FIG. 6B).

A loss can be computed based on a difference between the classification and a reference classification. For example, the reference classification of training time series data 702-1 may be a first class (e.g., first class 612 of FIG. 6A). As another example, the reference classification of training time series data 702-P may be a second class (e.g., second class 614 of FIG. 6B). The loss can serve as a basis for updating one or more parameters of the transformer model. For example, if the predicted classification result matches the reference classification result, then this may indicate that the transformer model accurately predicted the reference classification. Thus, parameters of the transformer model may remain the same or may be (slightly) updated based on the accurate prediction. Alternatively, if the predicted classification result does not match the reference classification result, then this may indicate that the transformer model did not accurately predict the reference classification. Thus, one or more parameters of the transformer model may be updated based on the incorrect prediction. This process can be repeated, for some or all of the plurality of sets of training data (e.g., training time series data 702-1 through 702-P), until one or more conditions are met.

For example, a condition being met may include an accuracy of the transformer model reaching (e.g., being equal to or greater than) a threshold model accuracy. As another example, the condition being met may include a certain number of sets of training data being analyzed, a certain number of training epochs transpiring, or a combination thereof. In some embodiments, one or more metrics may be computed to determine whether the training has been completed. For example, a holdout set of training events may be provided to the transformer model during validation. In this example, a validation loss may be computed, and a determination may be made as to whether training has been completed. For instance, the validation loss of the holdout set may be computed and if the validation loss (e.g., a log loss) does not decrease by more than a threshold amount (e.g., more than 0.001, more than 0.01, more than 0.1, and the like) over a next X steps, then this can indicate that the training has completed.

In some embodiments, model training subsystem 112 may be configured to facilitate an optimization process for the transformer model to learn to de-emphasize certain event types or pairings of events. For example, consider a first event and second event that occur within a short amount of time of one another (e.g., less than 1 second, less than 0.1 seconds, less than 0.01 seconds, etc.). If the transformer model generates a large attention score for the first event and the second event, and these events are ones that the transformer model should not be scoring so high, then model training subsystem 112 may train the transformer model to de-emphasize any occurrences of those event pairings.

In some embodiments, model training subsystem 112 may use a reward model to train the transformer model to de-emphasize any occurrences of those event pairings. As an example, model training subsystem 112 may be configured to optimize the transformer model to de-emphasize pairing events E1, E2 when those events occur within a threshold amount of time of one another. To do this, model training subsystem 112 may penalize time differences that are less than a threshold amount of time (e.g., $dt_{ij}=T_i-T_j \leq T_{Threshold}$).

In some embodiments, attention values computed for the event pairings to be de-emphasized can be masked randomly. The transformer model, during training, may or may not have access to the attention values (depending on whether those attention values have been masked). This can enable the transformer model to learn to rely less on those event pairings when making predictions. With this training process, an additional/auxiliary loss may be calculated that minimizes the attention values of the masked event pairings. For example, the additional loss may be computed as:

$$\mathcal{L} = \mathcal{L}_{normal} + c \cdot \sum a_{ij}.$$

Here, c is a constant and $a_{ij}$ corresponds to the attention value of a pair of events i and j that is to be de-emphasized.

Figure 8:
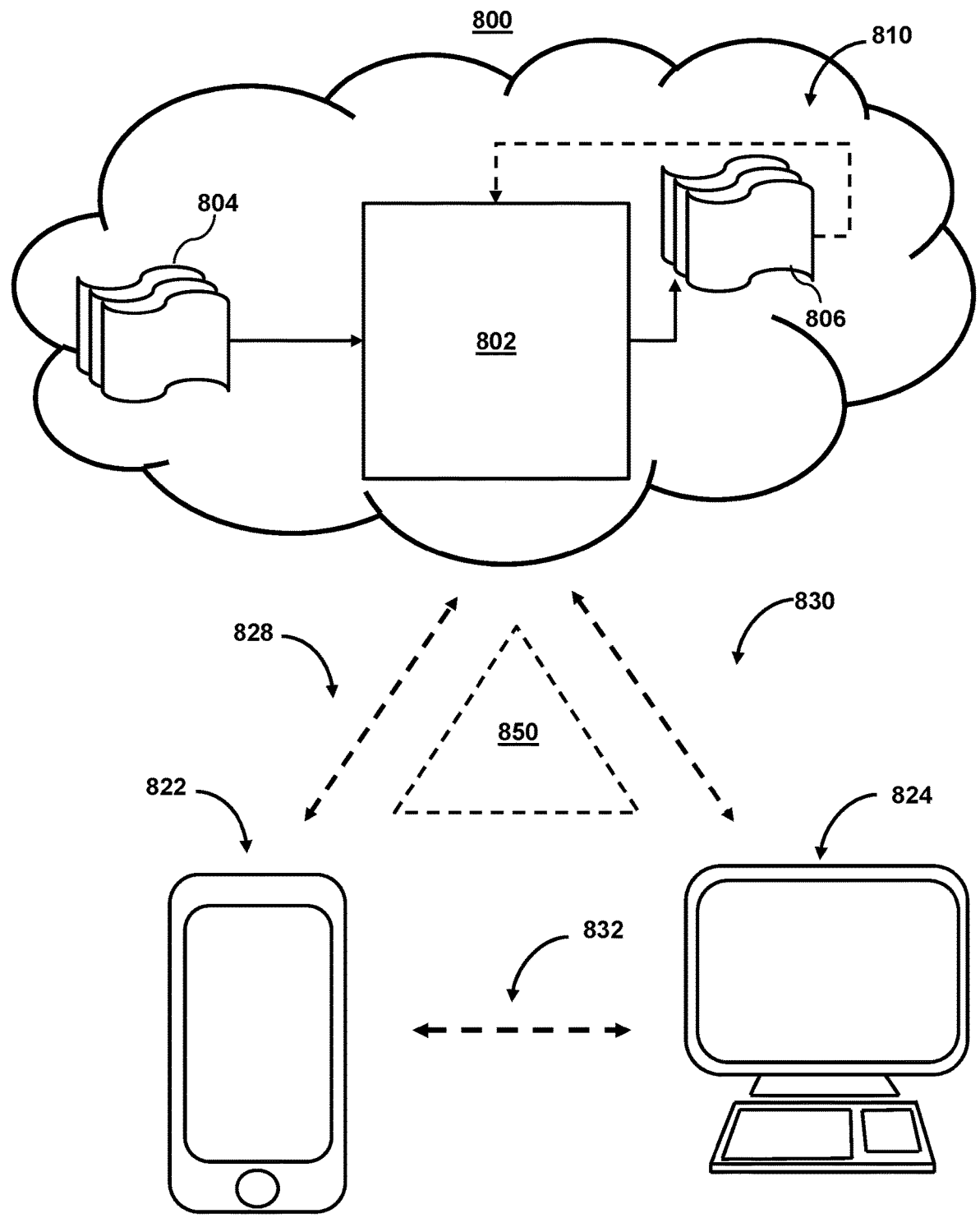
FIG. 8 illustrates an example system for decomposing attention values into event components and temporal components, in accordance with one or more embodiments.

FIG. 8 illustrates an example system for decomposing attention values into event components and temporal components, in accordance with one or more embodiments. For example, FIG. 8 may show illustrative components for decomposing attention values into event components and temporal components, which in turn can be used to determine or update transformer model classifications. As shown in FIG. 8, system 800 may include mobile device 822 and user terminal 824. While shown as a smartphone and personal computer, respectively, in FIG. 8, it should be noted that mobile device 822 and user terminal 824 may be any computing device, including, but not limited to, a laptop computer, a tablet computer, a handheld computer, and other computer equipment (e.g., a server), including "smart," wireless, wearable, and/or mobile devices. FIG. 8 also includes cloud components 810. In some embodiments, mobile device 822 and/or user terminal 824 may represent examples of client devices 104.

Cloud components 810 may alternatively be any computing device as described above and may include any type of mobile terminal, fixed terminal, or other device. For example, cloud components 810 may be implemented as a cloud computing system and may feature one or more component devices. In some embodiments, computing system 102 of FIG. 1 may be implemented as cloud components 810. It should also be noted that system 800 is not limited to three devices. Users may, for instance, utilize one or more devices to interact with one another, one or more servers, or other components of system 800. It should be noted that while one or more operations are described herein as being performed by particular components of system 800, these operations may, in some embodiments, be performed by other components of system 800. As an example, while one or more operations are described herein as being performed by components of mobile device 822, these operations may, in some embodiments, be performed by components of cloud components 810. In some embodiments, the various computers and systems described herein may include one or more computing devices that are programmed to perform the described functions. For example, the functionalities described above with respect to subsystems 110-112 may be implemented via one or more computing devices programmed to perform the aforementioned functions. Additionally, or alternatively, multiple users may interact with system 800 and/or one or more components of system 800. For example, in one embodiment, a first user and a second user may interact with system 800 using two different components.

With respect to the components of mobile device 822, user terminal 824, and cloud components 810, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 8, both mobile device 822 and user terminal 824 include a display upon which to display data.

Additionally, as mobile device 822 and user terminal 824 are shown as a touchscreen smartphone and a personal computer, these displays also function as user input interfaces. It should be noted that in some embodiments, the devices may have neither user input interfaces nor displays and may instead receive and display content using another device (e.g., a dedicated display device such as a computer screen and/or a dedicated input device such as a remote control, mouse, voice input, etc.). Additionally, the devices in system 800 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, virtual private networks, and/or other virtual storage resources). The electronic storages may store software algorithms, information determined by the processors, information obtained from servers, information obtained from client devices, or other information that enables the functionality as described herein.

FIG. 8 also includes communication paths 828, 830, and 832. Communication paths 828, 830, and 832 may include the Internet, a mobile phone network, a mobile voice or data network (e.g., a 5G or LTE network), a cable network, a public switched telephone network, or other types of communications networks or combinations of communications networks. Communication paths 828, 830, and 832 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 810 may include one or more of the components described in FIG. 1. For example, computing system 102, or one or more of subsystems 110-112, may be implemented using cloud components 810. Cloud components 810 may also include model 802, which may be a machine learning model, artificial intelligence model, etc. (which may be referred to collectively as "models" herein). As an illustrative example, model 802 may represent a transformer model, such as the transformer models implemented, executed, and trained using one or more of subsystems 110-112 of computing system 102 of FIG. 1. In some embodiments, model 802 may represent an untrained model or a model being trained; however, persons of ordinary skill in the art will recognize that this is exemplary and model 802 may be a trained artificial intelligence model.

Model 802 may take inputs 804 and provide outputs 806. The inputs may include multiple datasets, such as a training dataset and a test dataset. Each of the plurality of datasets (e.g., inputs 804) may include data subsets related to user data, predicted forecasts and/or errors, and/or actual forecasts and/or errors. In some embodiments, outputs 806 may be fed back to model 802 as input to train model 802 (e.g., alone or in conjunction with user indications of the accuracy of outputs 806, labels associated with the inputs, or other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., consistency of labels, predicted labels, version metadata, etc.).

To train model 802, training data may be retrieved by model training subsystem 112 of FIG. 1 from training data database 126. The training data may be stored in training data database 126. In some examples, the training data may be selected from a plurality of training datasets based on the particular type of model being trained.

In some embodiments, where model 802 is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, model 802 may be trained to generate better predictions.

In some embodiments, model 802 may include an artificial neural network. In such embodiments, model 802 may include an input layer and one or more hidden layers. Each neural unit of model 802 may be connected with many other neural units of model 802. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 802 may be self-learning and trained, rather than explicitly programmed, and can perform significantly better in certain areas of problem solving as compared to traditional computer programs. During training, an output layer of model 802 may correspond to a classification of model 802, and an input known to correspond to that classification may be input into an input layer of model 802 during training. During testing, an input without a known classification may be input into the input layer, and a determined classification may be output.

In some embodiments, model 802 may include multiple layers (e.g., where a signal path traverses from front layers to back layers). In some embodiments, backpropagation techniques may be utilized by model 802 where forward stimulation is used to reset weights on the "front" neural units. In some embodiments, stimulation and inhibition for model 802 may be more free-flowing, with connections interacting in a more chaotic and complex fashion. During testing, an output layer of model 802 may indicate whether or not a given input corresponds to a classification of model 802.

System 800 also includes API layer 850. API layer 850 may allow the system to generate summaries across different devices. In some embodiments, API layer 850 may be implemented on mobile device 822 or user terminal 824. Alternatively, or additionally, API layer 850 may reside on one or more of cloud components 810. API layer 850 (which may be a REST or web services API layer) may provide a decoupled interface to data and/or functionality of one or more applications. API layer 850 may provide a common, language-agnostic way of interacting with an application. Web services APIs offer a well-defined contract, called WSDL, that describes the services in terms of the API's operations and the data types used to exchange information. REST APIs do not typically have this contract; instead, they are documented with client libraries for most common languages, including Ruby, Java, PHP, and JavaScript. SOAP web services have traditionally been adopted in the enterprise for publishing internal services as well as for exchanging information with partners in B2B transactions.

API layer 850 may use various architectural arrangements. For example, system 800 may be partially based on API layer 850, such that there is strong adoption of SOAP and RESTful web services, using resources like Service Repository and Developer Portal, but with low governance, standardization, and separation of concerns. Alternatively, system 800 may be fully based on API layer 850, such that separation of concerns between layers like API layer 850, services, and applications are in place.

In some embodiments, the system architecture may use a microservice approach. Such systems may use two types of layers: front-end layer and back-end layer, where microservices reside. In this kind of architecture, the role of API layer 850 may provide integration between front-end and back-end. In such cases, API layer 850 may use RESTful APIs (exposition to front-end or even communication between microservices). API layer 850 may use AMQP (e.g., Kafka, RabbitMQ, etc.). API layer 850 may use incipient usage of new communications protocols such as gRPC, Thrift, etc.

In some embodiments, the system architecture may use an open API approach. In such cases, API layer 850 may use commercial or open-source API platforms and their modules. API layer 850 may use a developer portal. API layer 850 may use strong security constraints applying WAF and DDOS protection, and API layer 850 may use RESTful APIs as standard for external integration.

Figure 9:
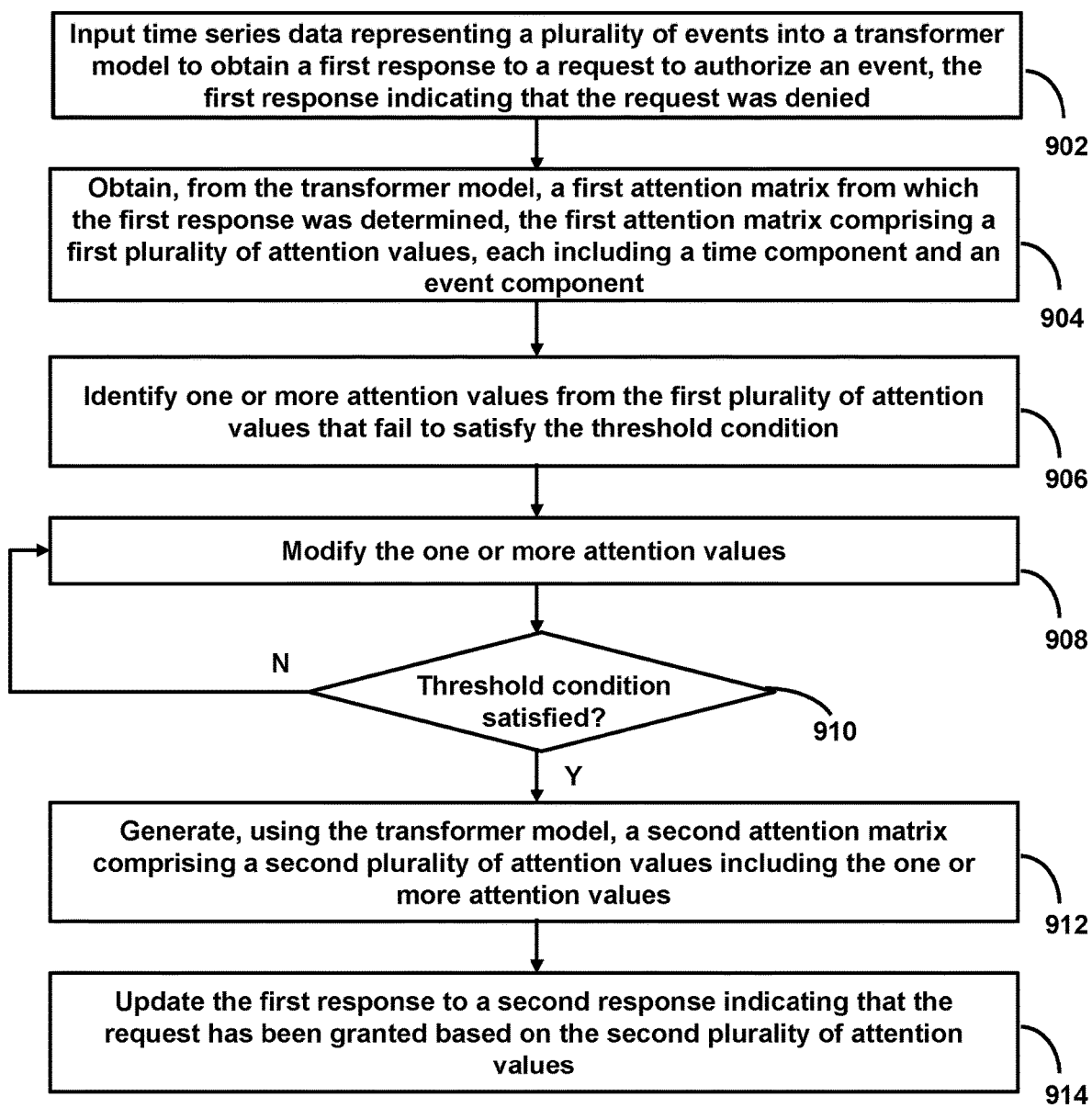
FIG. 9 illustrates a flowchart of an example process for determining whether to authorize a request based on a decomposition of attention values, in accordance with one or more embodiments.

FIG. 9 illustrates a flowchart of an example process 900 for determining whether to authorize a request based on a decomposition of attention values, in accordance with one or more embodiments (e.g., as implemented on one or more system components described above).

In some embodiments, process 900 may begin at operation 902. In operation 902, time series data representing a plurality of events may be input into a transformer model to obtain a first response to a request to authorize an event. In one or more examples, the first response may indicate that the request was denied. In some embodiments, the request to authorize an event may comprise a request to provide authorization for a user account based on the time series data. In some embodiments, the request may correspond to a request to approve a data transaction, a data transformation, a data transmission, or another type of event.

In some embodiments, the plurality of events may be respectively associated with a plurality of times and may include at least one query event occurring at a first time and a plurality of key events occurring at a plurality of second times. A plurality of respective time differences may be computed between the first time of each query event and each corresponding second time of the plurality of key events. The respective time differences may each differ. For instance, at least two (or more) of the plurality of respective time differences may be different. The magnitude of the time differences may vary. For example, the time difference between a first event of the plurality of events and a second event of the plurality of events may be less than or greater than another time difference between a third event of the plurality of events and a fourth event of the plurality of events. In one or more examples, two or more time differences may be equal or approximately equal (i.e., the corresponding two events occur within a threshold amount of time (e.g., less than 1 second, less than 0.1 seconds, less than 0.01 seconds, etc.) of one another).

In operation 904, a first attention matrix from which the first response was determined may be obtained from the transformer model. The first attention matrix may include a first plurality of attention values. In one or more examples, each attention value may include a time component and an event component. In some embodiments, the transformer model may be used to generate, based on the time series data, the first attention matrix. The transformer model may further be used to classify, based on the first attention matrix, the time series data into a first class. In some examples, the time series data being classified into the first class may indicate that the request to authorize the event was denied.

The first attention matrix may be obtained by generating a plurality of event embeddings corresponding to a plurality of events. The plurality of events may include a query event associated with a first time and a plurality of key events associated with a plurality of second times. A plurality of dot products may be computed of a query event embedding associated with the query event and each of a plurality of key event embeddings associated with the plurality of key events. In some embodiments, a plurality of respective time differences between the first time of the query event and each corresponding second time of the plurality of key events may be determined. The first plurality of attention values may be computed based on an aggregation of the plurality of dot products with a function of the plurality of respective time differences.

In some examples, the time component of each attention value can represent how much of the attention value is based on each of the plurality of respective time differences. The event component of each attention value can represent how much of the attention value is based on each of the plurality of dot products. Using the transformer model, and based on the first attention matrix, the time series data can be classified into a first class indicating that the request has been denied. In these examples, the first response can indicate that the time series data has been classified into the first class.

In some embodiments, the transformer model may be used to generate the first plurality of attention values. In one or more examples, values may be generated by aggregating a transformation of event embeddings associated with the plurality of events and a plurality of respective time differences associated with the plurality of events. The values, in some examples, may be normalized using one or more normalization functions (e.g., a SoftMax function). These normalized values may correspond to the plurality of attention values.

In operation 906, one or more attention values from the first plurality of attention values that fail to satisfy a threshold condition may be identified. In some examples, the threshold condition being satisfied comprises the time component of an attention value being greater than or equal to a threshold time component. In some embodiments, a subset of attention values from the plurality of attention values may be identified. The subset of attention values may include attention values that are greater than or equal to a threshold attention value. In some examples, an attention value that is greater than or equal to the threshold attention value may indicate that a provided response (e.g., the first response) was generated based on the subset of attention values. In some embodiments, the time component of each attention value from the subset of attention values may be compared to a threshold time score to determine the one or more attention values. In some examples, the threshold condition being satisfied comprises determining that the time components of attention values are less than the threshold time score.

In operation 908, the one or more attention values may be modified to satisfy the threshold condition. In some examples, modifying the one or more attention values comprises applying a weight to the one or more attention values. The weighting can modify the one or more attention values such that the time component of each of the one or more attention values is (or becomes) less than the threshold time component.

In operation 910, a determination may be made as to whether the threshold condition is satisfied. If not, process 900 may return to operation 908, where the one or more attention values may again be modified. However, if so, process 900 may proceed to operation 912.

In operation 912, the transformer model may be used to generate a second attention matrix comprising a second plurality of attention values including the one or more attention values in response to the one or more addition values being modified to satisfy the threshold condition. In one or more examples, some or all of the attention values that previously satisfied the threshold condition may remain unchanged. However, in some cases, these other attention values may be recomputed based on the modifications applied to the one or more attention values.

In operation 914, the first response may be updated to be a second response indicating that the request has been granted based on the second plurality of attention values. In some embodiments, the transformer model may have been used to classify the time series data into a first class indicating that the request has been denied based on the first attention matrix. In these examples, the first response can indicate that the time series data has been classified into the first class. However, after the second attention matrix is generated, the transformer model may be used to reclassify the time series data into a second class based on the second attention matrix. In one or more examples, classifying the time series data into the second class may indicate that the request has been granted. The second response can indicate that the time series data was reclassified into the second class.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 9.

Although the present invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for decomposing attention values into event components and time components.
2. The method of embodiment 1, comprising determining whether to authorize a request based on the decomposed attention values.
3. The method of any one of embodiments 1-2, comprising: inputting time series data representing a plurality of events into a transformer model to obtain a first response to a request to authorize an event, the first response indicating that the request was denied; obtaining, from the transformer model, a first attention matrix from which the first response was determined, the first attention matrix comprising a first plurality of attention values, each including a time component and an event component; identifying one or more attention values from the first plurality of attention values that fail to satisfy a threshold condition; responsive to modifying the one or more attention values to satisfy the threshold condition, generating, using the transformer model, a second attention matrix comprising a second plurality of attention values including the one or more attention values; and updating the first response to a second response indicating that the request has been granted based on the second plurality of attention values.
4. The method of embodiment 3, wherein inputting the time series data into the transformer model comprises: generating, using the transformer model, the first attention matrix; and classifying, using the transformer model, based on the first attention matrix, the time series data into a first class indicating that the request to authorize the event was denied.
5. The method of embodiment 4, wherein generating the first attention matrix comprises: generating a plurality of event embeddings corresponding to a plurality of events including a query event associated with a first time and a plurality of key events associated with a plurality of second times; calculating a plurality of dot products of a query event embedding associated with the query event and each of a plurality of key event embeddings associated with the plurality of key events; determining a plurality of respective time differences between the first time of the query event and each corresponding second time of the plurality of key events; and computing the first plurality of attention values based on an aggregation of the plurality of dot products with a function of the plurality of respective time differences.
6. The method of embodiment 5, wherein the time component of each attention value represents how much of the attention value is based on each of the plurality of respective time differences, and wherein the event component of each attention value represents how much of the attention value is based on each of the plurality of dot products.
7. The method of any one of embodiments 3-6, further comprising: classifying, using the transformer model, based on the first attention matrix, the time series data into a first class indicating that the request has been denied, the first response indicating that the time series data was classified into the first class.
8. The method of embodiment 7, wherein updating the first response comprises: reclassifying, using the transformer model, based on the second attention matrix, the time series data into a second class indicating that the request has been granted, the second response indicating that the time series data was reclassified into the second class.
9. The method of any one of embodiments 3-8, wherein the threshold condition being satisfied comprises the time component of an attention value being greater than or equal to a threshold time component, modifying each of the one or more attention values comprises: applying a weight to the one or more attention values to modify the one or more attention values such that the time component of each of the one or more attention values is less than the threshold time component.
10. The method of any one of embodiments 3-9, wherein the plurality of events are respectively associated with a plurality of times and include at least one query event occurring at a first time and a plurality of key events occurring at a plurality of second times, the method further comprises: computing a plurality of respective time differences between the first time of each query event and each corresponding second time of the plurality of key events, wherein two or more of the plurality of respective time differences differ.
11. The method of any one of embodiments 3-10, wherein identifying the one or more attention values comprises: determining, from the first plurality of attention values, a subset of attention values that each are greater than or equal to a threshold attention value indicating that the first response was generated based on the subset of attention values; and comparing the time component of each of the subset of attention values to a threshold time score to determine the one or more attention values, the threshold condition being satisfied for time components of attention values that are less than the threshold time score.
12. The method of any one of embodiments 3-11, further comprising: steps for training the transformer model to generate attention values based on time series data.
13. The method of any one of embodiments 3-12, further comprising: retrieving training data comprising training time series data representing a plurality of sets of training events, each set of training events comprising a training query event associated with a first time and a plurality of training key events associated with a plurality of second times; for each of the plurality of sets of training data: generating, using the transformer model, a plurality of training event embeddings comprising a training query event embedding corresponding to the training query event and a plurality of training key event embeddings corresponding to the plurality of training key events; executing, using the transformer model, a transformation to the plurality of training event embeddings, the transformation comprising a plurality of dot products of the training query event embedding with each of the plurality of training key event embeddings; determining a plurality of respective time differences between the first time of the training query event and each corresponding second time of the plurality of training key events; generating a plurality of training attention values by aggregating, with the plurality of dot products, a function of the plurality of respective time differences, each training attention value indicating a weight of a corresponding training key event in relation to the training query event, and each training attention value accounting for a respective time difference; determining a classification of the set of training events based on the plurality of training attention values; and computing a loss based on a difference between the classification and a reference classification; and updating one or more parameters of the transformer model based on the loss until a threshold model accuracy is reached.

14. The method of any one of embodiments 3-13, further comprising: using a reward model to train the transformer model to de-emphasize attention values corresponding to one or more event types.

15. The method of any one of embodiments 3-14, further comprising: generating, using the transformer model, the first plurality of attention values by normalizing, using a SoftMax function, values generated by aggregating a transformation of event embeddings associated with the plurality of events and a plurality of respective time differences associated with the plurality of events.

16. One or more non-transitory, machine-readable media storing instructions that, when executed by one or more data processing apparatuses, cause operations comprising those of any of embodiments 1-15.

17. A system comprising one or more processors and memory storing instructions that, when executed by the processors, cause the processors to effectuate operations comprising those of any of embodiments 1-15.

18. A system comprising means for performing any of embodiments 1-15.

19. A system comprising cloud-based circuitry for performing any of embodiments 1-15.

20. A service provider comprising one or more processors programmed to perform any of embodiments 1-15.

What is claimed is:

1. A system for responding to authorization requests based on time series classifications produced by transformer models, the system comprising:
at least one processor programmed to:
receive a request to provide authorization for a user account based on time series data, wherein the time series data represents a plurality of events, the plurality of events including (i) a query event associated with a first time and (ii) a plurality of key events associated with a plurality of second times;
input the time series data into a transformer model to obtain a response to the request indicating that the request to provide authorization has been denied, wherein the transformer model generates a first attention matrix based on the time series data by:
generating a plurality of event embeddings corresponding to the plurality of events,
calculating a plurality of dot products of a query event embedding associated with the query event and each of a plurality of key event embeddings associated with the plurality of key events,
determining a plurality of respective time differences between the first time of the query event and each corresponding second time of the plurality of key events; and
computing a first plurality of attention values based on an aggregation of the plurality of dot products with a function of the plurality of respective time differences, the first attention matrix comprising the first plurality of attention values;
calculate, for each of the first plurality of attention values, (i) a time component representing how much of the attention value is based on a time difference between a corresponding query event and key event and (ii) an event component representing how much of the attention value is based on a dot product of a query event embedding associated with the query event and a key event embedding associated with the corresponding key event;
identify one or more attention values from the first plurality of attention values, wherein the time component of each of the one or more attention values is greater than or equal to a threshold time component;
generate a second plurality of attention values by weighting each of the one or more attention values of the first plurality of attention values to reduce the time component is less than the threshold time component; and
based on the second plurality of attention values, update, using the transformer model, the response to indicate that the request has been authorized.

2. A method for determining whether to authorize a request, the method being implemented using at least one processor of a computing system, the method comprising:
inputting time series data representing a plurality of events into a transformer model to obtain a first response to a request to authorize an event, the first response indicating that the request was denied;
obtaining, from the transformer model, a first attention matrix from which the first response was determined, the first attention matrix comprising a first plurality of attention values, each including a time component and an event component;
identifying one or more attention values from the first plurality of attention values that fail to satisfy a threshold condition;
responsive to modifying the one or more attention values to satisfy the threshold condition, generating, using the transformer model, a second attention matrix comprising a second plurality of attention values including the one or more attention values; and
updating the first response to a second response indicating that the request has been granted based on the second plurality of attention values.

3. The method of claim 2, wherein inputting the time series data into the transformer model comprises:
generating, using the transformer model, the first attention matrix; and
classifying, using the transformer model, based on the first attention matrix, the time series data into a first class indicating that the request to authorize the event was denied.

4. The method of claim 3, wherein generating the first attention matrix comprises:
generating a plurality of event embeddings corresponding to a plurality of events including a query event associated with a first time and a plurality of key events associated with a plurality of second times;
calculating a plurality of dot products of a query event embedding associated with the query event and each of a plurality of key event embeddings associated with the plurality of key events;
determining a plurality of respective time differences between the first time of the query event and each corresponding second time of the plurality of key events; and
computing the first plurality of attention values based on an aggregation of the plurality of dot products with a function of the plurality of respective time differences.

5. The method of claim 4, wherein the time component of each attention value represents how much of the attention value is based on each of the plurality of respective time differences, and wherein the event component of each attention value represents how much of the attention value is based on each of the plurality of dot products.

6. The method of claim 2, further comprising:
classifying, using the transformer model, based on the first attention matrix, the time series data into a first class indicating that the request has been denied, the first response indicating that the time series data was classified into the first class.

7. The method of claim 6, wherein updating the first response comprises:
reclassifying, using the transformer model, based on the second attention matrix, the time series data into a second class indicating that the request has been granted, the second response indicating that the time series data was reclassified into the second class.

8. The method of claim 2, wherein the threshold condition being satisfied comprises the time component of an attention value being greater than or equal to a threshold time component, modifying each of the one or more attention values comprises:
applying a weight to the one or more attention values to modify the one or more attention values such that the time component of each of the one or more attention values is less than the threshold time component.

9. The method of claim 2, wherein the plurality of events are respectively associated with a plurality of times and include at least one query event occurring at a first time and a plurality of key events occurring at a plurality of second times, the method further comprises:
computing a plurality of respective time differences between the first time of each query event and each corresponding second time of the plurality of key events, wherein two or more of the plurality of respective time differences differ.

10. The method of claim 2, wherein identifying the one or more attention values comprises:
determining, from the first plurality of attention values, a subset of attention values that each are greater than or equal to a threshold attention value indicating that the first response was generated based on the subset of attention values; and
comparing the time component of each of the subset of attention values to a threshold time score to determine the one or more attention values, the threshold condition being satisfied for time components of attention values that are less than the threshold time score.

11. The method of claim 2, further comprising:
steps for training the transformer model to generate attention values based on time series data.

12. The method of claim 2, further comprising:
retrieving training data comprising training time series data representing a plurality of sets of training events, each set of training events comprising a training query event associated with a first time and a plurality of training key events associated with a plurality of second times;
for each of the plurality of sets of training data:
generating, using the transformer model, a plurality of training event embeddings comprising a training query event embedding corresponding to the training query event and a plurality of training key event embeddings corresponding to the plurality of training key events;
executing, using the transformer model, a transformation to the plurality of training event embeddings, the transformation comprising a plurality of dot products of the training query event embedding with each of the plurality of training key event embeddings;
determining a plurality of respective time differences between the first time of the training query event and each corresponding second time of the plurality of training key events;
generating a plurality of training attention values by aggregating, with the plurality of dot products, a function of the plurality of respective time differences, each training attention value indicating a weight of a corresponding training key event in relation to the training query event, and each training attention value accounting for a respective time difference;
determining a classification of the set of training events based on the plurality of training attention values; and
computing a loss based on a difference between the classification and a reference classification; and
updating one or more parameters of the transformer model based on the loss until a threshold model accuracy is reached.

13. The method of claim 2, further comprising:
using a reward model to train the transformer model to de-emphasize attention values corresponding to one or more event types.

14. The method of claim 2, further comprising:
generating, using the transformer model, the first plurality of attention values by normalizing, using a SoftMax function, values generated by aggregating a transformation of event embeddings associated with the plurality of events and a plurality of respective time differences associated with the plurality of events.

15. One or more non-transitory, computer-readable media storing instructions that, when executed by one or more processors, cause the one or more processors to effectuate operations comprising:
inputting time series data representing a plurality of events into a transformer model to obtain a first response to a request to authorize an event, the first response indicating that the request was denied;
obtaining, from the transformer model, a first attention matrix from which the first response was determined, the first attention matrix comprising a first plurality of attention values, each including a time component and an event component;
identifying one or more attention values from the first plurality of attention values that fail to satisfy a threshold condition;
responsive to modifying the one or more attention values to satisfy the threshold condition, generating, using the transformer model, a second attention matrix comprising a second plurality of attention values including the one or more attention values; and
updating the first response to a second response indicating that the request has been granted based on the second plurality of attention values.

16. The one or more non-transitory, computer-readable media of claim 15, wherein inputting the time series data into the transformer model comprises:
generating, using the transformer model, the first attention matrix; and
classifying, using the transformer model, based on the first attention matrix, the time series data into a first class indicating that the request to authorize the event was denied.

17. The one or more non-transitory, computer-readable media of claim 16, wherein generating the first attention matrix comprises:
- generating a plurality of event embeddings corresponding to a plurality of events including a query event associated with a first time and a plurality of key events associated with a plurality of second times;
- calculating a plurality of dot products of a query event embedding associated with the query event and each of a plurality of key event embeddings associated with the plurality of key events;
- determining a plurality of respective time differences between the first time of the query event and each corresponding second time of the plurality of key events; and
- computing the first plurality of attention values based on an aggregation of the plurality of dot products with a function of the plurality of respective time differences.

18. The one or more non-transitory, computer-readable media of claim 15, wherein the operations further comprise:
- classifying, using the transformer model, based on the first attention matrix, the time series data into a first class indicating that the request has been denied, the first response indicating that the time series data was classified into the first class.

19. The one or more non-transitory, computer-readable media of claim 18, wherein updating the first response comprises:
- reclassifying, using the transformer model, based on the second attention matrix, the time series data into a second class indicating that the request has been granted, the second response indicating that the time series data was classified into the second class.

20. The one or more non-transitory, computer-readable media of claim 15, wherein identifying the one or more attention values comprises:
- determining, from the first plurality of attention values, a subset of attention values that each are greater than or equal to a threshold attention value indicating that the first response was generated based on the subset of attention values; and
- comparing the time component of each of the subset of attention values to a threshold time score to determine the one or more attention values, the threshold condition being satisfied for time components of attention values that are less than the threshold time score.

* * * * *